US007662267B2

(12) United States Patent
Carson et al.

(10) Patent No.: US 7,662,267 B2
(45) Date of Patent: Feb. 16, 2010

(54) DEVICE AND METHOD FOR ELECTRODIALYSIS

(75) Inventors: William W. Carson, Hopkinton, MA (US); Keith J. Sims, Wayland, MA (US); Oleg Grebenyuk, Woburn, MA (US); Thomas J. Susa, Ludlow, MA (US); Hilda R. Zanapalidou, Winchester, MA (US); Wayne A. McRae, Mannedorf (CH); Russell J. MacDonald, Wilmington, MA (US)

(73) Assignee: Ionics, Incorporated, Watertown, MA (US)

( * ) Notice: Subject to any disclaimer, the term of this patent is extended or adjusted under 35 U.S.C. 154(b) by 1018 days.

(21) Appl. No.: 10/343,269

(22) PCT Filed: Aug. 10, 2001

(86) PCT No.: PCT/US01/25226

§ 371 (c)(1),
(2), (4) Date: Oct. 27, 2003

(87) PCT Pub. No.: WO02/14224

PCT Pub. Date: Feb. 21, 2002

(65) Prior Publication Data

US 2004/0060823 A1   Apr. 1, 2004

Related U.S. Application Data

(60) Provisional application No. 60/224,974, filed on Aug. 11, 2000, provisional application No. 60/236,778, filed on Sep. 29, 2000.

(51) Int. Cl.
*B01D 61/42* (2006.01)

(52) U.S. Cl. .............. 204/523; 204/525; 204/539; 204/630; 204/634

(58) Field of Classification Search ............... 204/523, 204/525, 539, 630, 634
See application file for complete search history.

(56) References Cited

U.S. PATENT DOCUMENTS 3,405,047 A * 10/1968 Kwo-Wei .............. 204/523
3,896,015 A    7/1975 McRae (Continued)

FOREIGN PATENT DOCUMENTS

WO   WO 97/25147   7/1997
WO   WO 00/67906   11/2000

OTHER PUBLICATIONS

Database WPI, Section Ch, Week 198233, Derwent Publications Ltd., London, GB; AN 1982-69793E, XP002413014 & SU 874 090 (LEBED NG), Oct. 25, 1981 abstract; figures.

*Primary Examiner*—Arun S Phasge
(74) *Attorney, Agent, or Firm*—David Silverstein; Andover-IP-Law

(57) ABSTRACT

An improved apparatus and operating method related thereto for deionizing water to produce substantially pure water using electric field and ion exchange materials are disclosed, including embodiments incorporating one or more of the novel features of brine and electrode streams flowing in a direction counter-current to the stream being deionized, a filling of the brine stream with stratified ion exchange materials, a stream mixing feature for mixing the stream being deionized, a gas removal feature for removal of gases, a spiral-wound embodiment of an electrodialysis device according to the invention, and a method for determining the preferred operating current for electrodialysis systems according to this invention.

49 Claims, 11 Drawing Sheets

U.S. PATENT DOCUMENTS

| | | |
|---|---|---|
| 4,033,850 A | 7/1977 | Kedem et al. |
| 4,999,098 A | 3/1991 | Pohl et al. |
| 5,026,465 A | 6/1991 | Katz et al. |
| 5,376,253 A | 12/1994 | Rychen et al. |
| 6,149,788 A * | 11/2000 | Tessier et al. .............. 204/524 |
| 6,284,115 B1 * | 9/2001 | Apffel ...................... 204/518 |
| 6,780,328 B1 * | 8/2004 | Zhang ...................... 210/663 |

\* cited by examiner

DEVICE AND METHOD FOR ELECTRODIALYSIS

CROSS-REFERENCE TO RELATED APPLICATIONS

This application claims priority to international patent application PCT/US01/25226, filed Aug. 10, 2001, which in turn claims the benefit of U.S. provisional patent application 60/224,974 filed Aug. 11, 2000 and U.S. provisional patent application 60/236,778 filed Sep. 29, 2000.

FIELD OF THE INVENTION

This invention pertains to improved electrodialysis ("ED" including "EDR") apparatus and systems, including improved filled cell electrodialysis apparatus and systems, and to improved processes which uses such apparatus and systems. (Filled cell ED is also known in this art as electrodeionization ("EDI"). Filled cell EDR is also known in this art as reversing electodeionization ("EDIR")).

BACKGROUND OF THE INVENTION

ED apparatus having a multiplicity of alternating anion selective and cation selective membranes was apparently first described by K. Meyer and W. Strauss in 1940 (Helv. Chim. Acta 23 (1940) 795-800). The membranes used in this early ED apparatus were poorly ion selective. The discovery of ion exchange ("IX") membranes (e.g., in U.S. Pat. No. Re. 24,865) which had high ion permselectivity, low electrical resistance and excellent stability led rapidly to the invention of ED using such membranes (e.g., in U.S. Pat. No. 2,636,852) and to the growth of industries using such apparatus, for example, for desalting of brackish water, concentration of sea water, and deashing of cheese whey. During the last 40 years approximately 5000 ED plants have been installed on a world-wide basis.

The utility of ED continues to be limited, however, by several technical actors, particularly relatively low limiting current densities and deficiencies in removing poorly ionized substances. These limitations and deficiencies of prior art ED systems are discussed further below.

A. Limiting Current Density:

Because the IX membranes used in ED are highly selective to ions of one sign or the other, a substantial fraction of the ions passing through the membranes must reach the membrane wails by diffusion from the ambient solution through laminar flow layers which develop along the interfaces between the membranes and the solutions being depleted of ions (the "dilute or diluting solutions or streams" as they are known in the art). The maximum rate of diffusion of ions through the diluting solution occurs when the concentration of electrolyte at such membrane interfaces is essentially zero. The current density corresponding to such zero concentration at a membrane interface is referred to in the art as the limiting current density. To increase the limiting current density it is necessary to increase the rate of ion diffusion, for example, by reducing the thickness of the laminar flow layers by flowing the ambient solution rapidly by the membrane surfaces and/or by the use of turbulence promoters, and/or by increasing the temperature. Practical limiting current densities are genera in the range of 5,000 to 10,000 amperes per square meter for each kilogram-equivalent of salts per cubic meter of solution (that is, 0.5 to 1 amperes per square centimeter for each gram-equivalent of salts per liter). A typical brackish water has a concentration of salts of about 0.05 kg-eq/m.$^3$ (that is about 0.05-eq/l or about 3000 parts per million ("ppm")), and therefore has a limiting current density in the range of about 250 to 500 amperes per m.$^2$ (0.025 to 0.05 amperes per cm$^2$). In order to maximize the utilization of ED apparatus, it is desirable to operate at the highest possible current densities. However, as the limiting current density is approached, it is found that water is dissociated (i.e., "split") into hydrogen ions and hydroxide ions at the interfaces between the (conventional) anion exchange ("AX") membranes and the diluting streams. The hydrogen ions pass into the diluting streams while the hydroxide ions pass through the AX membranes and into the adjacent solutions which are being enriched in ions (the "concentrate, concentrated, concentrating or brine solutions or streams" as they are known in the art). Because brackish water may often contain calcium bicarbonate, there is also a tendency for calcium carbonate to precipitate at the surfaces of the (conventional) AX membranes which are in contact with the concentrating streams. This problem previously has been addressed by several techniques: by chemical or IX softening of the feed waters or the concentrating streams; by adding acid to the feed waters or the concentrating streams (with or without decarbonation); by nanofiltration ("NF"); or, by regularly reversing the direction of passage of the electric current thereby changing the concentrating streams to diluting streams (and the diluting streams to concentrating streams). See, e.g., U.S. Pat. No. 2,863,813. Of the above techniques, the most successful process has been the last mentioned process, namely reversing the electric current, which is referred to in the art as "electrodialysis reversal" ("EDR").

The theory of limiting current in ED shows that in the case of sodium chloride solution, for example, the cation exchange ("CX") membranes should reach their limiting current density at values which are about ⅔ rds that of the AX membranes. Careful measurements have shown that such is indeed the case. However, as the liming current density of (conventional) CX membranes is approached or exceeded, it is found that water is not split into hydroxide ions and hydrogen ions at the interfaces between such CX membranes and the diluting steams. The difference in behavior relative to the water splitting phenomenon of (conventional) AX and CX membranes at their respective limiting currents has been explained in recent years as catalysis of water splitting by weakly basic amines in the AX membranes. AX membranes which have only quaternary ammonium anion exchange groups (and no weakly basic groups) initially do not significantly split water as their limiting current is approached. Such behavior continues for only several hours, however, after which period water splitting begins and increases with time. It is found that the AX membranes then contain some weakly basic groups which have resulted from hydrolysis of quaternary ammonium groups. It is concluded that splitting of water at conventional AX membranes at or near their limiting current densities is an unfortunate phenomenon which is unavoidable for practical purposes.

The existence of limiting current in ED also means that in dilute solutions the liming current densities are relatively very low. For example, at a concentration of salts of about 0.005 kg-eq/m.$^3$ (that is about 0.005 g-eq/l or about 300 ppm, a concentration typical of drinking water), the limiting current density is in the range of from about 25 to 50 amperes per m.$^2$ (0.0025 to 0.005 amperes per m.$^2$), i.e., the transfer of salts per unit area per unit time is very low (e.g., 50 to 100 grams of salt per hour per square meter). This problem seems first to have been addressed by W. Walters et al. in 1955 (Ind. Eng. Chem. 47 (1955) 61-67) by filling the diluting stream compartments in an ED stack (i.e., a series of AX and CX membranes) with a mixture of strong base and strong acid ion exchange (IX) granules. Since then many patents have issued on this subject, among them U.S. Pat. Nos. 3,149,061; 3,291,713; 4,632,745; 5,026,465; 5,066,375; 5,120,416; and 5,203,976, which patents are incorporated herein by reference. Two modes of operation using such filled-cell ED (known as EDI) have been identified. In the first mode, the IX granules serve as extensions of the membrane surface area thereby greatly increasing the limiting current density. In the second mode, a current density is applied which is very much greater than the limiting current density even with the presence of the IX granules. Under these circumstances, the rate of water splitting at membrane-diluting stream interfaces is very high and the IX granules are predominantly in the strong base and strong acid forms respectively. The apparatus in this mode is therefore best described as operating as continuously electrolytically regenerated (mixed bed) ion exchange. An intermediate mode may also be identified in which there is some water splitting but the IX granules are not predominantly in the strong base and strong acid forms respectively.

Most filled-cell ED (that is, EDI) systems operate in both modes, e.g., (1) in the same ED cell, the first mode near the entrance to the cell and the second mode near the et (2) in cells in flow series between a single pair of electrodes; or, (3) in separate stacks in flow series (each stack with its own pair of electrodes). Filled-cell ED is used to replace reverse osmosis or conventional, chemically regenerated IX systems, e.g., a strong acid CX column followed by a weakly basic AX column or, at least in part, a mixed bed IX column. In either of the latter cases, the CX and AX granules are chemically regenerated separately, e.g., with aqueous acidic solutions of sulfuric acid or hydrochloric acid and aqueous basic solutions of sodium hydroxide respectively. Precipitates of calcium carbonate, calcium sulfate and magnesium hydroxide are thereby not obtained. The columns of fine granules are effective filters for colloid matter which is rinsed off the granules during the chemical regeneration. In contrast, in the case of EDI, any calcium, bicarbonate and/or sulfate removed from the diluting stream occurs in a higher concentration in the concentrating stream, particularly when it is desired to achieve high recoveries of the diluting stream (which is the usual case). Such higher concentrations frequently result in precipitation in the concentrating stream. Furthermore, it is inconvenient (though technically possible) to back-wash the IX granules in a filled-cell ED apparatus thereby removing any colloidal matter which may have been filtered out.

These problems with EDI are generally solved by pretreatment processes, for example: (1) regenerable cation exchange for softening followed by regenerable anion exchange absorbents for colloid removal and/or bicarbonate removal; (2) ultrafiltration or microfiltration for colloid removal followed by EDR for softening and partial demineralization; or, (3) ultrafiltration or microfiltration for colloid removal followed by nanofiltration for softening or reverse osmosis for softening and partial demineralization.

As pointed out above, filled-cell ED is used to replace, at least in part, a mixed bed IX column. The latter, however, generally produces water having an electrical resistance of about 18 meg ohm-cm and silica concentrations near the present limits of detection. Such high performance by filled-cell ED (EDI) has been difficult to achieve until now.

B. Removal of Poorly Ionized Substances:

ED (including EDR) is used in many plants to deash cheese whey. Generally the natural whey is first concentrated to the range of 20 to 25 percent solids by weight. The current density (that is, the rate of removal of ash per unit area of membrane per unit time) during ED (or EDR) of such concentrated whey remains relatively high until about 50 to 60 percent of the ash is removed. The remaining ash behaves as if it is poorly ionized, perhaps associated or complexed with protein in the whey. An important market for deashed whey requires 90 percent or higher deashing. To deash from about a 40 percent ash level to a 10 percent ash level using ED (including EDR) may require much more apparatus contact time than to deash from 100 percent to 40 percent ash. This problem may be addressed by the more or less continuous addition of acid to the whey during deashing from 40 to 10 percent ash, the acid apparently freeing the ash from the protein. However, such added acid is rapidly removed by ED (including EDR), and the resulting high quantities of acid required to complete this process are therefore undesirable. The problem has also been addressed by removing about the first 60 percent of the whey ash using ED (including EDR) and removing most of the remaining 40 percent by ion exchange. The ion exchange apparatus for this application generally consists of a column of strong acid CX granules followed by a column of weak base AX granules. Considerable quantities of acid and base are required in this process to regenerate the IX granules.

As discussed above, electrodeionization (EDI) using filled ED cells is a very useful process for removing the last traces of ionic contaminants from water, but it could be significantly improved. These desired improvements include:

1) unproved product purity. The sources of impurities in EDI systems include but are not limited to:
   (a) Back diffusion and electromigration of ionic contaminants through the ion exchange membranes driven by concentration differences and electric fields;
   (b) Back diffusion of neutral weakly ionized species through polarized membranes; and,
   (c) Electrodialysis of contaminant ions from membranes into the product water in the dilute stream manifolds.
2) Simplification of the equipment and controls needed to run traditional EDI. Today these EDI subsystems include brine recirculation, brine and electrolyte pH and conductivity control. Simplification should include lowering of equipment cost, reducing required operator expertise and shortening the time required for monitoring and adjusting equipment.
3) Reduction of the electric power consumption used for the EDI stack and pumps.
4) Improved resistance to scale formation in the concentrate streams.
5) Need for less pretreatment of the water before EDI.
6) Improved product water quality without sacrificing product water recovery.
7) Ability to operate intermittently and to produce excellent product immediately upon
8) Ability to operate with elevated solution delivery pressure thereby eliminating the need for a transfer pump.
9) Ability to reliably operate without external leaks and without external salt build up.

Most, if not all, of the above limitations and deficiencies of conventional EDI systems are either overcome or at least significantly improved upon by the improved apparatus and methods for electrodialysis according to the present invention. Other objects and advantages of the present invention will in part be obvious and will in part appear hereinafter. The invention accordingly comprises, but is not limited to, the apparatus and related methods, involving the several steps and the various components, and the relation and order of one or more such steps and components with respect to each of the others, as exemplified by the following description and the accompanying drawings. Various modifications of and variations on the apparatus and methods as herein described will be apparent to those skilled in the art, and all such modifications and variations are considered within the scope of the invention.

SUMMARY OF THE INVENTION

In accordance with a first embodiment of the present invention, one means of achieving the desired improvements is to use the product of the EDI unit as the feed to the concentrate stream and electrode stream compartments, and to flow the concentrate and electrode streams of the EDI unit in a flow direction substantially opposite that of the product stream in a single pass. This can be accomplished in a preferred embodiment by configuring the apparatus such that the product outlet manifold (reference numeral 3 as shown in FIG. 1A) serves as the inlet manifold for the concentrate stream (in concentrating compartments 7) and electrode stream (in electrode compartments 8). Due to the high electrical resistance of the staring concentrate and electrode streams these compartments should preferably provide electrical continuity by ion transport through ion exchange material. Thus, the concentrate and electrode streams are at least park filled with an ion exchange material or these compartments utilize ion exchange membranes with a surface texture that allows them to be in contact with each other at asperities while allowing fluid flow around the asperities. It is preferred that the effluent from the concentrating compartments in the above embodiments of this invention not be recycled to the concentrate compartments, or, if recycled, recycled by an auxiliary entrance manifold at an intermediate position in the concentrate flow paths.

Such internal reflux of dilute effluent to concentrate influent is advantageously used together with periodic reversal of the direction of electric current through the EDI stack. If such current reversal is continued for a substantial period (e.g., if the reversal is essentially symmetric with respect to time), then it is preferred in accordance with this invention that the direction of flow through the dilute and concentrating compartments also be reversed, the effluent from the "new" dilute compartment then providing pure reflux to the influent to the "new" concentrating compartment.

The flow rate of dilute effluent to the concentrating compartments in the above-described internal reflux mode is, of course, only a fraction of the effluent coming from the diluting compartments. Nevertheless, it may be necessary and preferred to provide a back pressure for the dilute effluent coming from the stack, such back pressure for example being provided by the pressure loss through a mixed bed ion exchange apparatus to which such dilute effluent is directly connected without repressurization.

The concentrate effluent may, for example, be reclaimed at least in part by Reverse Osmosis, Nanofiltration, Evaporation or another stage of ED.

In order to make ultrapure water by EDI, it is necessary to remove the highly ionized electrolytes such as NaCl, $CaSO_4$, etc., as well as the weakly ionized electrolytes such as $CO_2$, $NH_3$, $SiO_2$, and $H_3BO_3$. Such weakly ionized electrolytes are only substantially removed after almost all of the strongly dissociated ions ($Na+$, $Cl-$, $Ca++$, $SO4-$, etc.) have been removed. Efficient removal of the weak electrolytes is obtained (generally) at very low local current efficiencies, where almost all of the current passing through the exchange membranes is carried by $OH-$ and $H+$ respectively. If the concentrate stream is at a substantially neutral pH and not filled with an ion exchange material, then the weakly ionized electrolytes, such as silica, after transport through the anion exchange membrane, become substantially non-ionized in the bulk of the brine streams. The cation exchange membrane, although mainly preventing transport of the negatively charged strong ions back to the diluting stream, is unable to prevent the diffusion of low molecular weight neutral species such as $CO_2$, $SiO_2$, and $H_3BO_3$ back to the dilute stream. The anion exchange membrane, although preventing transport of the positively charged strong ions back to the diluting stream, is unable to prevent the diffusion of low molecular weight neutral species such as $NH_3$ and amines back to the dilute stream.

The concentrate stream may have a very low conductivity, such that it represents more than half of the electrical resistance of the EDI stack. In such a case it may be desirable to fill the concentrate stream with an ion exchange material. The ion exchange material in the concentrate stream may have cation exchange material next to the cation exchange membrane and anion exchange material next to the anion membrane. U.S. Pat. No. 4,033,850, which is incorporated herein by reference, discloses such an arrangement of ion exchange material, but only for the diluting compartments of an electrodialysis device. The cation exchange material juxtaposed to the cation exchange membrane may be integral with (e.g., texture thereon) or not integral with such membrane (e.g., as beads, rods, screen, etc.). Similarly, the anion exchange material juxtaposed to the anion exchange membrane may also be integral with such membrane or not integral with such membrane, independently of which arrangement is used with the cation exchange membrane. That is, one membrane may have exchange material which is integral with the membrane while the other membrane has exchange material which is not integral. Further, either or both membranes may for example be textured and in addition have non-integral exchange material of the same charge sign juxtaposed. If both membranes are textured, the membranes may in places be in direct contact with each other with the open regions between the texture surface projections providing fluid flow paths. In any of the above examples, it will be understood that flow of solution through the concentrating compartment must not be severely impeded.

In EDI spacers there is some maldistribution of flow through the ion exchange material due to the intersection of the sidewalls and the material. Because a three-dimensional ion exchange bead can not partially penetrate the sidewalls, the packing arrangement of ion exchange material near the sidewalls is not as uniform as the arrangement in the bulk of the material away from the sidewalls, and this steric hindrance allows more flow next to the sidewalls. The slipstream that thus develops next to a sidewall has both a greater diffusion distance to, and less residence time in contact with, the ion exchange material; and, as a result, along the diluting compartment spacer has fewer ions removed. This slipstream therefore carries a greater load of contaminants to the outlet end of the diluting compartment spacer where the slipstream mixes with the bulk of the spacer flow thereby decreasing the purity of the product.

In accordance with another embodiment of the present invention, however, it has been found that this effect can be minimized by adding mechanical static mixers to the sidewalls of the spacers at intervals along the spacer length. These static mixers help to mix the slipstream flowing along the sidewalls with the bulk of the flow thereby providing increased contact time to improve the removal of the contaminants by the ion exchange material. Thus, addition of the static mixers as provided herein has been found to further improve product quality. An arrangement of suitable static mixers along the spacer sidewalls of an EDI cell in accordance with this invention is illustrated in FIG. 3.

Gas bubbles trapped in the ion exchange material or formed by outgassing of the water also may cause flow maldistribution and thereby decrease product quality. Bubbles generated at the electrodes can also be trapped in the ion exchange material and grow large enough to cause poor current distribution in the EDI stack. All of these bubbles are difficult to remove by buoyancy or flow effects due to the small size of the ion exchange materials and the surface tension (capillary effect) attendant writ this size range which tends to hold them in place.

In accordance with yet another embodiment of the present invention, gas permeable (e.g., non-porous and/or hydrophobic microporous) regions and/or elements, such as hollow fibers or other geometries, are incorporated into the EDI spacers to provide a means for the gases in the bubbles to permeate through the regions and/or into the lumens of the hollow fibers and escape from the stack without loss of any liquid. An EDI cell including an arrangement of hydrophobic microporous hollow fibers in accordance with this invention is illustrated in FIG. 4. Also illustrated in FIG. 4 is the embodiment of providing an EDI cell with EDI spacers having hydrophobic, microporous regions.

BRIEF DESCRIPTION OF THE DRAWINGS

FIG. 1B also depicts the approximate direction of the diluting stream flow 16, concentrate streams flow 17, and electrode streams flow 18. The dotted lines between the various manifolds represent possible spacer shapes defining fluid flow paths between the facing walls of adjacent spacers for the three different stream types, i.e., diluting, concentrating and electrode.

DETAILED DESCRIPTION OF THE PREFERRED EMBODIMENTS

Figure 1A:
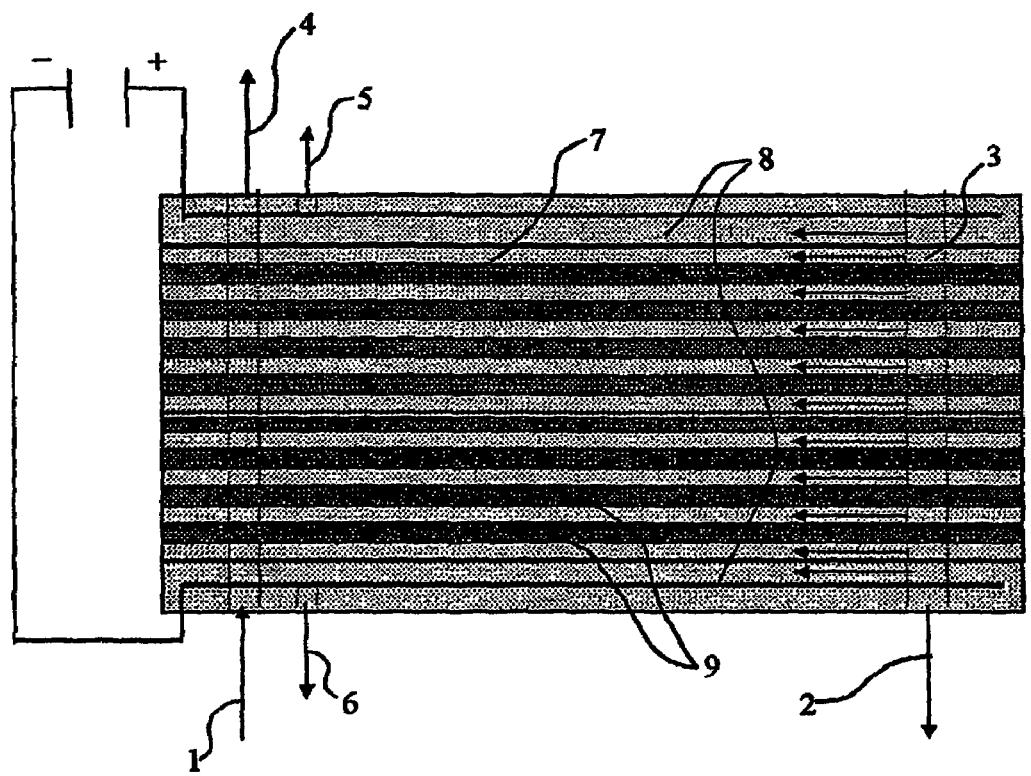
FIG. 1A is a schematic cross sectional view of a "plate and frame" type EDI stack in accordance with this invention showing feed inlet 1, outlet 4 and common manifold 3 from which the product outlet 2 emerges. The figure also depicts anode outlet 5, cathode outlet 6, concentrate compartments 7, electrode compartments 8, and diluting compartments 9.
Figure 1B:
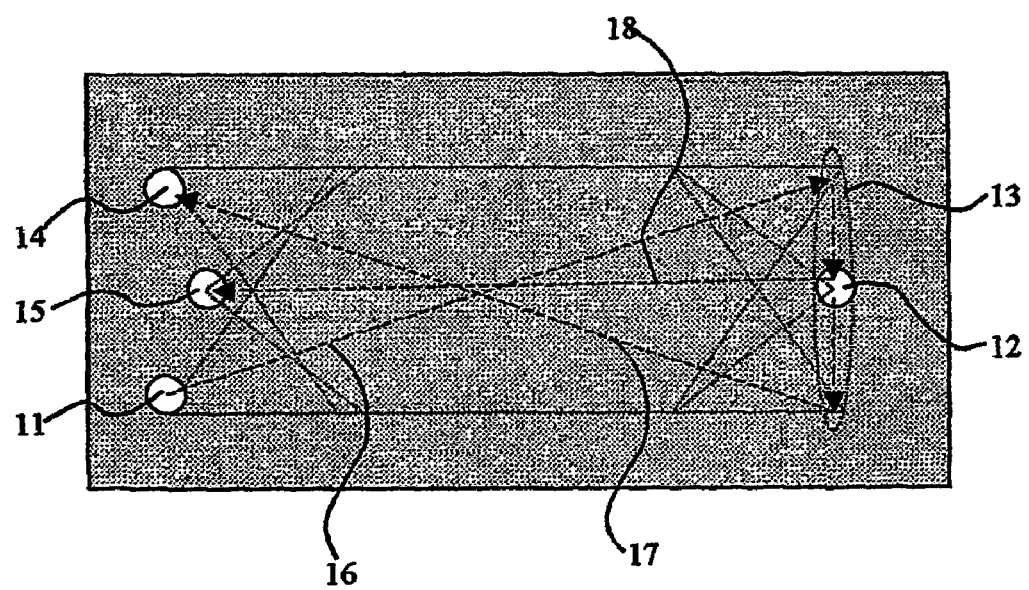
FIG. 1B is a schematic top view of the EDI stack of FIG. 1A showing feed inlet 11, common manifold 13, product outlet 12, concentrate stream outlet 14, and anode stream outlet 15.
Figure 2A:
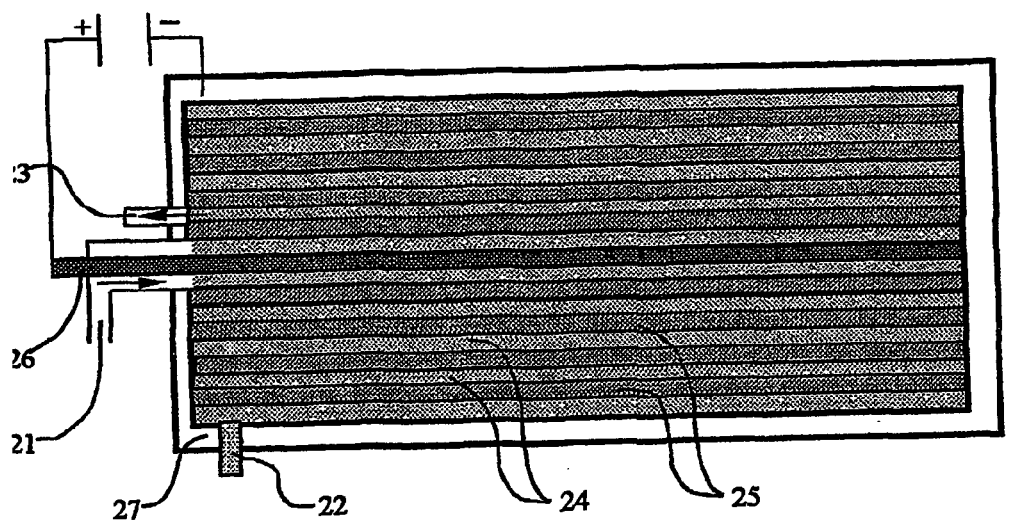
FIG. 2A shows a schematic cross sectional view of an alternative spiral EDI stack or module configuration in accordance with this invention with feed inlet 21, the product outlet 22, the concentrate steam outlet 23, the diluting steams 24, the concentrate streams 25, the center electrode 26 (which, in a preferred case as shown, comprises an anode), and an exterior conducting (e.g., metal) container 27 which acts as the opposite electrode.
Figure 2B:
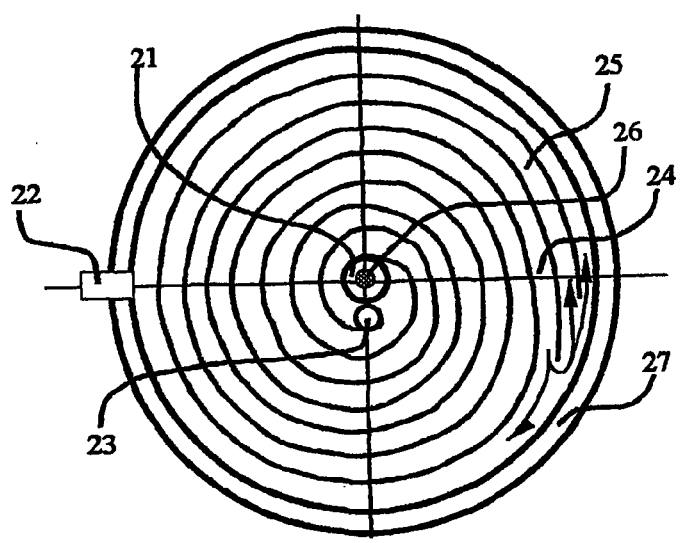
FIG. 2B is a schematic left end view of the complete (unsectioned) spiral EDI stack of FIG. 2A showing the same entities (with the same numbers).

One embodiment of the present invention, as shown in FIGS. 1A and 1B, uses the final product of the EDI stack to feed the concentrate stream and the electrode streams in a single pass. The preferred direction to flow the concentrate streams (in concentrating compartments 7) and electrode streams (in electrode compartments 8) is in a direction substantially opposite to the direction of flow of the diluting stream (in diluting compartments 9). In this single pass embodiment, employing an initially high purity, substantially counterflow concentrate stream minimizes back diffusion and electromigration of contaminants into the product. The membranes located close to the product outlet are not exposed to contaminants so that these membranes contain very little contamination, with the beneficial result that electrodialysis and/or diffusion of contaminants from these membranes into the product is effectively eliminated. Due to the low conductivity of the product, the concentrate and electrode streams are preferably provided with electrical continuity by using ion conductive material in the respective compartment at least near the entrances thereto. This ion exchange material may be in the form of beads, granules, fibers, rods, screens, cloth, felt, fabrics, surface texturing of the membranes themselves, as herein described, etc. The ion exchange material preferably contacts both membranes which bound the concentrate compartment and forms a continuous contact route between these membranes at least near such entrances. In the electrode compartment; the ion exchange material preferably contacts the electrode and the membrane which bound the electrode compartment and forms a continuous contact route between them. Alternatively the electrodes may be in intimate contact with, or integral with, the adjacent membranes. The EDI stack as shown in FIGS. 1A and 1B may contain an even or odd number of cells.

The following Example illustrates the effectiveness of a single-pass EDI unit as illustrated in FIGS. 1A and 1B.

EXAMPLE

The effectiveness of an EDI apparatus using a single-pass substantially counter-current concentrate stream flow as shown in FIGS. 1A and 1B Knit A) was evaluated relative to a conventional EDI apparatus (Control) having substantially co-current recirculating concentrate stream flow. Both EDI stacks were assembled using the same types and numbers of membranes, spacers, and ion exchange resins. Table 1 below shows the remarkable improvement in performance demonstrated by the apparatus of the present invention (Unit A) relative to the Control unit for a brine stream in which the concentration of $CO_2$ is relatively high.

TABLE 1

|  | Control | Unit A |
| --- | --- | --- |
| Feed Conductivity (microS/cm) | 20 | 37 |
| Feed $CO_2$ (ppb) | 300 | 23,610 |
| Brine $CO_2$ (ppm) | 310 | 411 |
| Feed Silica (ppb) | 500 | 1,064 |
| Residence Time (sec.) | 40 | 40 |
| Current (Amps) | 1.5 | 0.82 |
| Product Resistance (Mohm-cm) | 10.4 | 17.88 |

As shown in Table 1 the product quality of the single pass reverse brine stack, Unit A, is maintained even at high concentrations of carbon dioxide in the brine stream. The single pass reverse brine stack is not strongly affected by the back diffusion of carbon dioxide from the brine stream, because any back diffusion occurs at a point far upstream from the end of the dilute flow path, and thus can be absorbed by the ion exchange material.

The ion exchange material in the concentrate flow path may be amphoteric, cationic, anionic, a mixture of cationic and anionic materials, or layers or other geometric arrangements of cationic and anionic materials. In a preferred embodiment of the present invention, a material in the concentrate compartment consists of anion exchange material next to the anion exchange membrane and cation exchange material next to the cation exchange membrane with the two types of ion exchange materials being in contact with each other near the center of the compartment. The ion exchange material in the electrode stream flow path may be amphoteric, cationic, anionic, a mixture of cationic and anionic materials, or layers or other geometric arrangements of cationic and anionic materials. In a preferred embodiment of the present invention, a material in the electrode stream compartment consists of cation exchange material. Some of the cells may be bounded by ion exchange membranes of the same charge, resulting in what may be termed "neutral" cells or compartments. In one of these neutral compartments, ions pass through the compartment without changing the total concentration of ionized or ionizable species. The ion exchange material in the flow path of these neutral cells may be amphoteric, cationic, anionic, a mile of cationic and anionic materials, or layers or other geometric arrangements of cationic and anionic materials.

In order to achieve a lower electrical resistance through the ion exchange material packing in the compartments, the ion exchange material may be shrunk using aqueous solutions of either electrolytes, or water miscible organics such as glycerin, propylene glycol, sugars, etc., or partial drying before it is used to fill the EDI unit. When electrolytes are used, it may be preferable to use electrolytes (which are well known in the art) which increase the amount of shrinkage of the ion exchange material. After the shrunken ion exchange material has been introduced to the EDI unit, washing it with water will expand it, resulting in a greater compressive force inside a packed compartment, and thereby resulting in essentially squashing the beads or particles of ion exchange material to obtain a greater area of contact between the ion exchange materials themselves as well as with the ion exchange membranes and the electrodes. One of the electrolytes that may be used in this process step is a chloride salt. In order to avoid the generation of chlorine in the anode compartment, and the possible oxidation of the ion exchange materials contained in said anode compartment, during the initial startup of the stack, one preferred embodiment of this aspect of the present invention uses non-chloride containing salts.

Enhanced compressive force in non-polarized regions increases the contact area between the ion exchange material and the ion exchange membranes. This effect is beneficial because as the contact area increases the electrical resistance decreases. This increased contact area thus improves the transport of ions to the ion exchange membranes and helps prevent the undesirable effect of polarization of the membranes before polarization of the ion exchange fill material. If the anion membrane polarizes before the ion exchange material polarizes, hydroxyl ions transported through the membrane cause a localized high pH in the concentrating steam. Calcium ions transported through the cation membrane may enter this high pH area and precipitate, thus forming scale.

In a preferred embodiment of the present invention, the stack is built with the ion exchange materials in their fully regenerated forms. This preferred embodiment minimizes the diffusion of salts from the membrane areas between the solid areas of the spacer frame, which are outside of the active electric field, to the product manifold.

Another embodiment of the present invention uses screens or cloths consisting of polymeric material that has been ion exchange functionalized at least on the surge. EDI cells filled with beads, particulate or fine fiber ion exchange packing can be used only with clean, particulate-free streams. These filled cells typically exhibit high hydraulic resistance, trans-bed pressure gradients, and pumping power losses. Conventional EDIR also has the potential disadvantage of a slow approach to equilibrium after current reversal due to the relatively high ion storage capacity present in ion exchange materials functionalized throughout their entire structure. Instead, by functionalizing only a thin layer on the outer surface of a polymeric material, such as polypropylene, polyethylene, etc., the approach to equilibrium after reversal is significantly faster. Using such material in the form of a woven cloth type screen or an extruded monofilament screen (such as Vexar), or perforated, corrugated screen or expanded plastic screen results in a much lower hydraulic pressure drop, enabling longer flow paths and reduced pumping power.

Figure 3:
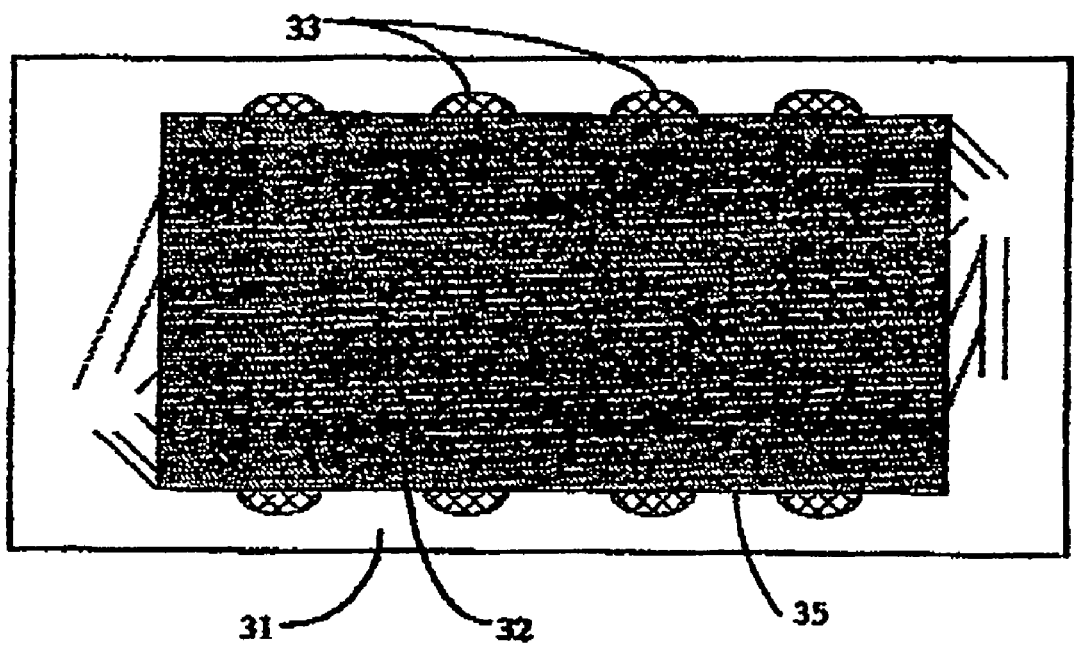
FIG. 3 is a schematic plan view of a filled (EDI) spacer in accordance with this invention showing spacer frame 31, filed in the center with ion exchange material 32, and having multiple screen mixers 33 along sidewalls 35.

With all or most types of IX material there will be a discontinuity in the density of the packing array where the array ends at a boundary, such as a spacer wall. Due to this discontinuity, a slipstream flow can develop along such wall which may be fester than the flow through the bulk portion of the array. This slipstream flow has less residence time in the spacer and less contact with the ion exchange material. In the diluting compartment where contaminants are being removed from water, this means that the slipstream will have a higher concentration of contaminants, and therefore a lower electrical rice than the bulk flow through the bulk portion of the array. The mixing of slipstream flow with bulk product flow at the spacer outlet will therefore increase the total amount of the contaminants in the total product flow and decrease the electrical resistance of such total product flow. To ameliorate this slipstream effect, in another embodiment of the present invention static mixed are added along the length of the spacer wall as shown in FIG. 3. These static mixers may be placed at intervals or alternatively may fill the entire open area of the spacer. It has been found that the effect of such mixers is to mix slipstream flow with the bulk of the diluting stream flow so that the former will have more contact time with the ion exchange material and thereby have more contaminants removed.

Such static mixers nay consist of screens, such as those made by Vexar, Inc., or woven screens, or perforated, corrugated or expanded screens. The static mixers may be made of polyethylene, polypropylene, or any insoluble material, and are preferably attached to the spacer wall. In another variation, such screens may also be made at least in part of ion exchange materials. The screens may protrude at intervals into the bulk ion exchange material or may extend across the entire spacer area to provide mixing of the slipstream with the bulk flow. In a preferred embodiment of this aspect of the present invention, the screens are recessed into the spacer wall and divert the flow to be mixed into the screen space in the wall.

The spacing of the screen strands may be between 0.01 inches (0.254 mm) and 1.0 inches (25.4 mm), preferably between 0.0625 inches (1.59 mm) and 0.5 inches (12.7 mm), and most preferably between 0.1 inches (2.54 mm) and 0.25 inches (6.35 mm). The optimum thickness of the screens and the spacing of the static mixers along the spacer walls are dependent in part on the dimensions and geometry of the ion exchange material. For ion exchange beads or granules with a mean diameter of about 0.5 mm, the screen thickness might advantageously be between 0.001 mm and 10 mm. If the screen extends throughout the entire spacer, its strands should be thin enough and spaced far enough apart as to not significantly interfere with the contacts between the ion exchange materials unless at least the surfaces of the screens are made of an ion exchange material.

Gas bubbles can be trapped in the ion exchange materials, be generated at the electrodes, or be formed by outgassing of the aqueous stream. Small gas bubbles trapped between beads of ion exchange material can cause significant variation in hydraulic permeability and flow in the EDI spacers. These small bubbles may grow to a size at which they can result in poor current distribution and, in the extreme case, cause membrane burning or electrode failure. U.S. Pat. No. 5,558,753, which is incorporated herein by reference, discloses means for gas removal in the concentrating steam recycle loop.

Figure 4:
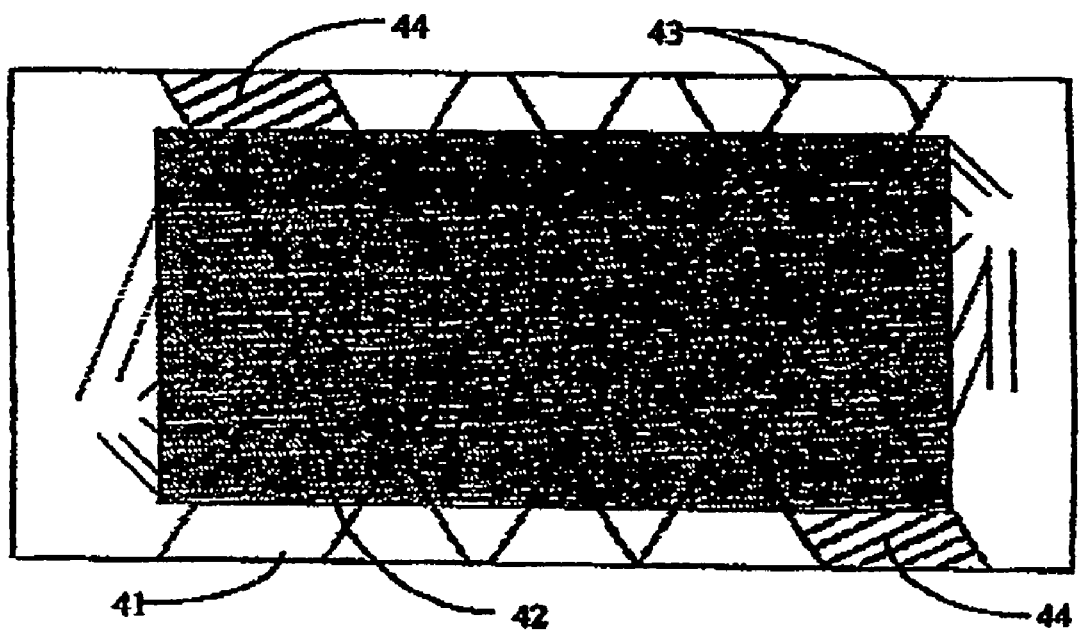
FIG. 4 is a schematic plan view of a filled (EDI) spacer in accordance with this invention showing spacer fame 41, filled in the center with ion exchange material 42, and having microporous hydrophobic elements 43, and/or hydrophobic microporous regions 44.

Gas bubbles may also be trapped in diluting stream, concentrating stream or electrode stream compartments of an EDI stack. In accordance with still another aspect of the present invention, it has been found that gas-permeable materials can be used to allow trapped gases to permeate out of such EDI compartments. Such gas-permeable materials may be hydrophobic and microporous so that the gases permeate through the pores of the material, or they may be nonporous (e.g., silicone rubber) so that the gases diffuse through the body of the material. If the material is hydrophobic and microporous, the pores must be of small enough effective diameter so that surface tension prevents penetration of liquid into the pores at the operating pressures of the EDI apparatus resulting in the loss of liquid. In one embodiment of this aspect of the present invention, these materials may be incorporated into the EDI spacers in the form of gas-permeable regions, hollow fibers and/or other geometries as shown in FIG. 4. These gas-permeable materials may be supported by other materials on the side of the gas-permeable material opposite the side facing the aqueous stream.

Another preferred embodiment of the present invention provides the EDI unit in the form of a spiral-wound element, with the product outlet feeding the inlet of a single-pass concentrate stream as genera shown in FIGS. 2, 10, 11, 12, and 13. In contrast to U.S. Pat. No. 5,376,253, which discloses a configuration wherein there is a tight seal separating the dilute and concentrate streams, in this embodiment of the present invention, the dilute effluent and concentrate influent streams share a common manifold. Thus, in the spiral-wound configuration of this invention, the diluting stream may optionally be fed to either the anode compartment or the cathode compartment before passing through the diluting stream compartment. Furthermore, a portion optionally may exit as product just prior to the electrode compartment or after passing through the opposite electrode compartment. The spiral-wound element of the present invention may consist of a single pair of membranes (cation exchange and anion exchange) wound together (as illustrated in the Figures), or it may consist of two pairs or multiple pairs (a configuration which is readily understood but not shown in the Figures). In either case, the spiral winding defines a (virtual) central axis about which the membranes are wound to create the appearance of a spiral (when viewed endwise). The flow of liquid through the concentrating compartment(s) may be inward toward the virtual axis or alternatively flow may be outward away from such axis. In accordance with this embodiment of the present invention, the flow of liquid through the diluting compartment(s) is then respectively outward or, alternatively, inward. In still another variation using the spiral configuration, the flow of liquid through the concentrating compartment(s) may instead be generally "parallel" to the virtual axis (e.g., in a direction from left to right) and, alternatively "anti-parallel" (which is defied herein as being the opposite of the "parallel" direction, in this example from right to left) with the corresponding flow through the diluting compartment(s) being countercurrent, i.e., respectively "anti-parallel" and, alternatively, "parallel." In other words, in this embodiment flow may be generally parallel to the virtual axis in a first direction and, alternatively, generally parallel to the virtual axis in a second, opposite direction.

In any of the above cases, the electric current through the spiral may be reversed thereby resulting in the "old" concentrating compartments becoming "new" diluting compartments, and, respectively, the "old" diluting compartments becoming "new" concentrating compartments. After such current reversal, the direction of flow through the compartments is reversed in accordance with this embodiment of the invention, with the "new" diluting compartments providing counter-flow of "pure" effluent to the "new" concentrating compartments.

The preferred current to apply to the EDI unit configured and operated in accordance with this invention may be determined by plotting the following equation:

$$R_{prod} \text{ vs } I/q(C_{in}-C_{out})$$

where $R_{prod}$ is the electrical resistance of the product of the diluting cells, I is the current applied to the EDI unit, q is the volumetric flow rate to the diluting cells, $C_{in}$ is the concentration of ionized or ionizable species in the solution fed per diluting cell in equivalents per unit volume, and $C_{out}$ is the concentration of ionized or ionizable species in the solution exiting per diluting cell in equivalents per unit volume.

The plot of this data will have an inflection point. The preferred current to apply to the EDI unit should be a current above this inflection point $R_{prod}$, I, q, $C_{in}$, and $C_{out}$ may be expressed in any compatible units, as the object of interest is the inflection point. Furthermore, it should be noted that a line fitted to data points below the inflection point has one slope, whereas a line fitted to data points above the inflection point has a second, different slope. The inflection point corresponds to the point on the data plot at which the absolute value of the second derivative $(d^2 R_{prod}/d(I/q(C_{in}-C_{out}))^2)$ is a maximum. This means that if a regression formula is used to fit the data to the plot, it must be such that the second derivative is still a variable of $I/q(C_{in}-C_{out})$. Alternatively, instead of plotting $R_{prod}$ vs $I/q(C_{in}-C_{out})$, one can plot any of the following data correlations to determine the inflection point:

$$R_{prod} \text{ vs } i/q(C_{in}-C_{out})$$

$$R_{prod} \text{ vs } i/q(c_{in}-c_{out})$$

$$R_{prod} \text{ vs } (R_{in}R_{prod})/q(R_{prod}-R_{in})$$

$$R_{prod} \text{ vs } (R_{in}R_{prod})/qv_p(R_{prod}-R_{in})$$

where $R_{in}$ is the electrical resistance of the feed to the diluting compartments, i is the average current density, $c_{in}$ is the conductivity of the feed to the diluting compartments, and $C_{out}$ is the conductivity of the effluent from the diluting compartments. It will be clear to one skilled in the art that it is preferable to select from the above alternative data correlations one which produces a sharp change in slope near the inflection point. Further it will be understood that either side of any of the above correlations can be multiplied or divided by a constant without altering the inflection point value. The multiplication or division constant need not be the same for each side of a correlation as the impact will be understood to expand or shrink one, or the other, or both axes. In addition, a constant may be added or subbed from either side, which will shift the graphical location of the inflection point with altering its value. For example, this means that in an actual plot of the data, the axes may be individually expanded or contracted or offset if that makes it easier or more convenient for determining the inflection point. The correlation data can be manipulated in other ways well known in the art if desired.

Another aspect of the present invention is a method of automatically controlling the current sent through the EDI unit according to the ionic load being fed to the unit. It is desirable from an efficiency standpoint to send more current through the unit at higher ionic loads, and less current as the ionic load decreases. The automatic control is achieved, according to this aspect of the present invention by monitoring the EDI feed stream by means of an associated conductivity cell/meter and using the (preferably temperature-corrected) output of the conductivity meter to automatically adjust the amount of current sent to the EDI unit. This embodiment therefore minimizes the average power consumption and improves the overall unit performance.

Efficient capture of silica and boric acid from aqueous solutions using electrodialysis typically requires large amounts of anion resin in the regenerated form. It has been found that the presence of carbonate in a diluting stream significantly reduces the amount of such anion resin available, and therefore the efficiency of silica and boric acid capture is greatly reduced by the presence of carbonate. The current efficiency of removing all but the first portion of carbonate is very poor because the bulk of the resin is then in the $OH^{-1}$ form, and the mobility of $OH^{-1}$ is about 3 times higher than carbonate for a specific resin. When anion resin is in the 50% carbonate and 50% hydroxide form, it takes 8 electrodes to remove one $CO_2$ molecule, that is 6 to move $OH^{-1}$, and 2 to move the $CO_3^{-2}$. When anion resin is in the 20% carbonate and 80% hydroxide form, it takes 26 electrons to remove one carbonate with 24 of these "wasted" on moving $OH^{-1}$. $CO_2$ however can be very efficiently removed as bicarbonate using only one electron per $CO_2$ if the resin is not highly polarized. (Despite the $HCO_3^{-1}$ having only about 20 percent of the mobility of $OH^{-1}$, there are virtually no $OH^{-1}$ ions present if $HCO_3^{-1}$ is present in significant concentrations.)

Operating the stack with the current automatically controlled on a real time basis relative to the ionic load, according to this aspect of the present invention will result in the $CO_2$ removal occurring primarily as bicarbonate with correspondingly greater efficiency, in essentially the same location in the stack. While miming the average power consumption, this mode of operation leaves a maximum amount of the stack's anion resin in the desirable $OH^{-1}$ form.

This phenomenon can be best understood by an example: If the current is constant, and the anion load is doubled for a brief time, $CO_2$ would be captured and removed from the resin much closer to the stack outlet end. At the high anion load, the $CO_2$ will be efficiently removed as bicarbonate, but the silica removal capability of the stack will be severely compromised by the reduction in the hydroxide form of the resin available to capture silica. Moreover, this problem can be exacerbated by the fact that there can be a very significant transient release of silica into the product water because the carbonate, and then bicarbonate, both displace the silicate that was present in the anion resin. Even after the high anion load transient is completed, the situation does not improve. The $HCO_3^{-1}$ saturated resin quickly polarizes, and the efficiency of electrical removal of the resulting carbonate plunges rapidly. Thus, it takes a very long time with lots of current before the efficient capture of silica can be reestablished in this system. As can be seen by extrapolating this example, continuous fluctuation in the current efficiency of operation of the stack will result in poor silica removal that is nearly as bad as if it were operated continuously at the lowest instantaneous current efficiency.

It has now been found in accordance with another embodiment of the present invention that a feedback loop from the feed conductivity (or conductivity, flow and alkalinity) and/or stack electrical impedance to control current, can greatly improve system performance. Such electric current control may be advantageously effected by incorporating segmented electrodes in the electrodialysis stack. Either or both electrodes may be segmented permitting the current (density) at various regions in the flow paths of the dilute compartments to be fine tuned in accordance with the ionic load to such compartments. These segmented electrodes can also be used to determine the impedance at various regions along the length of the flow paths. This impedance information can be used to determine the relative state of the ion exchange materials (i.e., fully regenerated ion exchange materials have a lower resistance than those in a salt form) and to automatically adjust the current through specific segments to fine time the current (density) to individual segments in accordance with the ionic load.

Furthermore, the nature (type) of the anion exchange resin, whether as material non-integral with the anion exchange membranes or, at least in part integral with such membranes, may be varied along the flow path. By way of illustration, in order of decreasing basicity, the common anion exchange moieties may be aged approximately as follows:

(1)

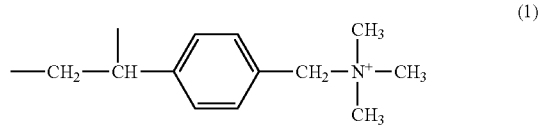

"Type I", poly(N-vinyl benzyl-N,N,N,-trimethyl ammonium)

(2)

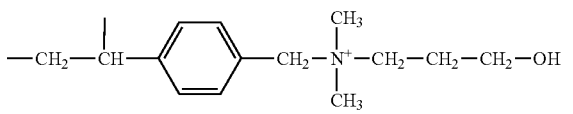

"Type III", poly(N-vinyl benzyl-N-(3-hydroxy propyl)-N,N-dimethyl ammonium)

(3)

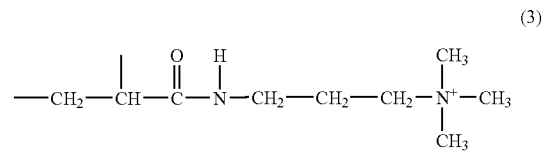

"Acrylic quaternary", poly(N-acrylamidopropyl)-N,N,N-trimethyl ammonium)

(4)

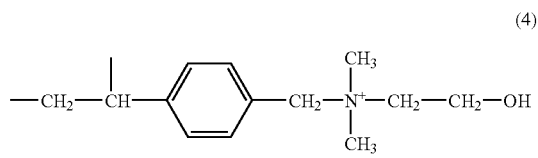

"Type II", poly(N-vinyl benzyl-N-(2-hydroxy ethyl)-N,N-dimethyl ammonium)

(5)

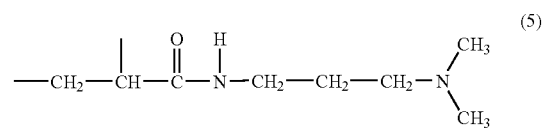

"Weak base", poly (N-acrylamido propyl)-N,N-diethyl amine.

The latter anion exchange resin (formula 5 above) appears to be the most basic of the so-called weak base anion exchange resins. In its free base for, it is sufficiently basic to form a salt with $CO_2$ (apparently absorbed primarily as $HCO_3^{-1}$ and not $CO_3^{-2}$). It is not, however, sufficiently basic to form a salt with silica.

At the upper end of the above scale, Type I anion exchange ("AX") resins (formula 1 above) and their equivalents in the hydroxide form are very strong bases, very able to absorb silica and boric acid and, as noted above, absorbing $CO_2$ primarily as $CO_3^{-2}$ and not $HCO_3^{-1}$).

The internal $pK_b$ (the negative logarithm of the base dissociation constant) is reported in the literature for the above resins. It has been found that the ratio of the fraction of electrical current carried by absorbed free and combined carbon dioxide to the fraction of current carried by hydroxide ions is greatest for the weak base resin at the bottom of the above list (formula 5) and smallest for the very strong base resin at the top of the list (formula 1). It is advantageous, therefore, according to this embodiment of this invention to use resins from the lower part of the above list (e.g., formulas 4 and 5 or their substantial equivalents) to localize and control removal of free and combined carbon dioxide in a region of the flow paths of the dilute compartments in the vicinity of the flow entrances thereto, and to use resins from the upper part of the above list (e.g., formulas 1, 2 and 3 or their substantial equivalents) to localize and control removal of silica and/or boric acid in a region of the flow paths of the dilute compartments in the vicinity of the flow exits therefrom.

Although the above listed Type II resin and weak base resin are frequently regarded as "intermediate base" resins, such term is usually reserved for anion exchange resins deliberately containing quaternary ammonium groups and non-quaternary amine groups. Such resins may be manufactured as such or prepared by controlled degradation of appropriate quaternary ammonium resins. The wide variety of such resins makes it difficult to include them in the above list relative to the listed resins, but one skilled in the art can easily determine the useless of any specific intermediate base or other resin for the present embodiment of this invention.

In particular, ED or EDR benefits from an uneven texture or a raised resin on the surface of ion exchange membranes because such a surface of proper geometry creates a more turbulent flow across the membrane surface and thus reduces the formation of stagnant ion-depleted regions near the membrane surface, in addition to creating more surface area, as can clearly be seen in FIGS. 5, 6, 7, 8 and 9. The formation of stagnant, ion-depleted regions near the membrane surface leads to a phenomenon termed "concentration polarization," which adversely affects the performance of ED and EDR systems. The textured or raised surface membranes of this embodiment of this invention may be used in any electrodialysis compartment where the process benefits from an increase in turbulent flow across the membrane and/or increased membrane surface area, which surface area includes channels between the membranes or between a membrane and an electrode.

The ion exchange membranes according to this embodiment of the present invention are advantageously patterned so that several layers are produced. For example, in one premed form a flow path is produced at one depth and a textured surface is produced between the flow paths. On the perimeter of the membranes, the surfaces are advantageously lower to allow for a nonconductive or conductive frame between the edge of the membrane and the next adjacent membrane. In this way an ED, EDR, EDIR or EDI stack can be constructed without using separate "spacers" to produce the flow path between membranes for the liquid to be treated.

The novel membranes of this aspect of the invention may also be used in a non-electrical system applications where ion exchange, ion capture, or neutralization takes place between ions in fluid and solid ion exchange media having a high surface area. Such membrane applications include but are not limited to use as a demineralizer, a water softening media, pH adjusting media, and metal selective or ion selective media (nitrate selective or monovalent ion selective).

In accordance with this aspect of the present invention, an uneven texture or a raised resin is imparted to the surface of ion exchange membranes, thereby creating a significantly greater surface area for use in EDI, EDIR, ED, EDR or other electrically driven processes that use ion exchange membranes and would benefit from having a non-flat surface as illustrated in FIGS. 5, 6, 7, 8 and 9. These textured or raised surface membranes can be fabricated using standard membrane formulations for ion exchange membranes. These membranes can also be fabricated as charge-selective (monovalent ion selective) membranes or species-selective membranes, such as heavy metal-selective, nitrate-selective or sodium-selective membranes.

A particularly advantageous use for the raised surface membranes described herein is in EDI applications in place of ion exchange resins that are usually placed between two membranes or between membranes and electrodes. Any section of an EDI stack where an ion exchange resin positioned next to the same charge ion exchange membrane is presently used may advantageously be replaced with a raised surface membrane according to this invention. Also, such membranes may be used in any electrodialysis compartment that benefits from an increase in turbulent flow across the membrane and/ or from increased membrane surface area, i.e., through channels between membranes or between membranes and electrodes.

Such surface textured membranes may also advantageously be used in an EDI stack to improve the contact area between ion exchange materials in fled cells and the surface of the membrane. As previously discussed, such increased contact area decreases the cell electrical resistance and improves the transport of ions from the ion exchange filler material to the ion exchange membranes.

Figure 5A:
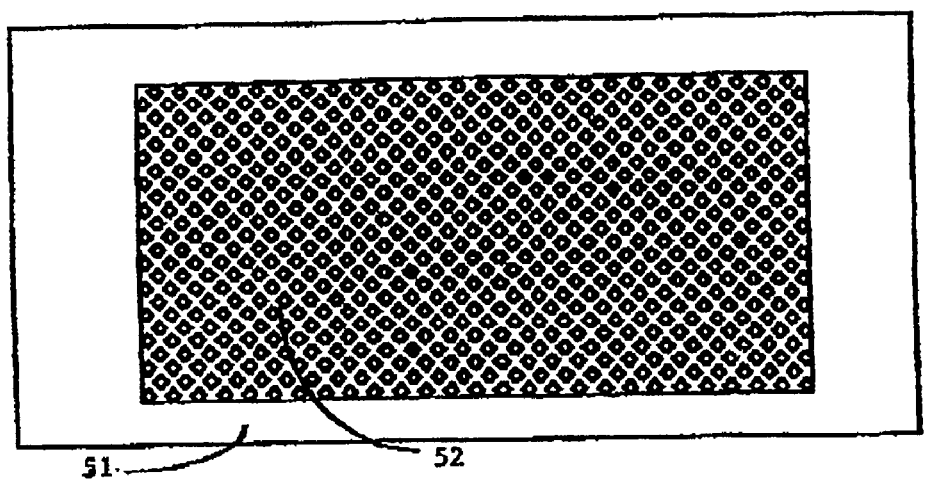
FIG. 5A is a schematic plan view of one embodiment of a textured-surface membrane 51 in accordance with this invention showing the raised texture 52 in the center portion on one surface only. Although not shown, it will be understood that membranes textured on both surfaces may be fabricated and used in accordance with this invention.
Figure 5B:
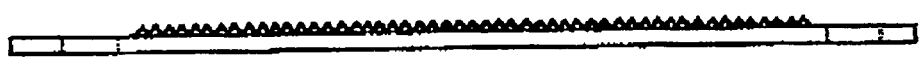
FIG. 5B is a schematic side view of the textured-surface membrane of FIG. 5A.

One textured surface membrane embodiment of the present invention is illustrated in FIGS. 5A and 5B, where a membrane is shown with a textured surface on only one side of the membrane sheet so that it can be placed against the smooth surface of the next membrane, or against an ion exchange material used to produce a filled cell. In a first case, the textured surface of the membrane provides a flow path means for liquid to flow between the membranes without the need for a spacer or screen, which would normally be used to provide a hydraulic flow path. In a second case, the textured surface of the membrane will also provide a greater contact area between the ion exchange filler material and the membrane.

In an alternative embodiment, a membrane is provided with a textured spice on both sides. In one case, in conjunction with a textured surface of an adjacent membrane, a flow path is provided for liquid passage between the membranes without the need for a spacer or screen, which would normally be used to provide the hydraulic flow path. In another case, the textured surfaces of two membranes bound a filled cell containing an ion exchange material and provide a greater contact area between the ion exchange material and the membranes. In said another alternative embodiment; every other membrane in a stack may be textured on both sides, and the intervening membranes are not textured on either side.

Figure 6:
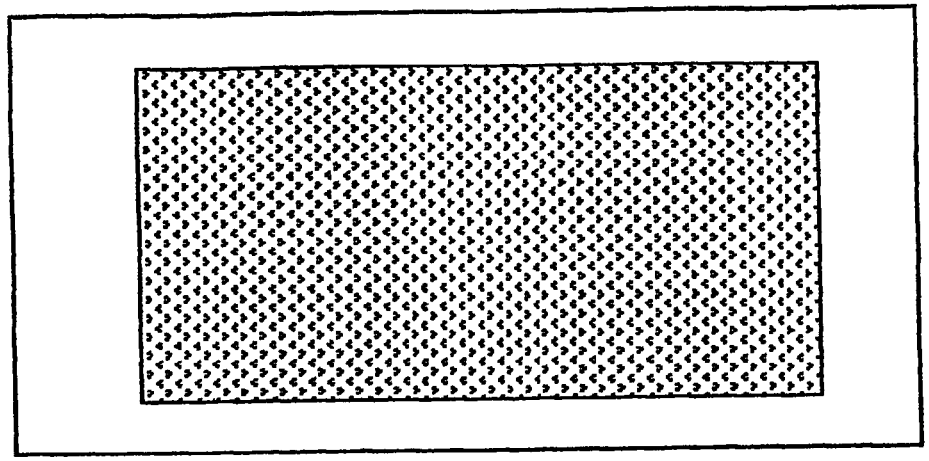
FIG. 6 is a schematic plan view of still another type of textured-surface membrane in accordance with this invention, this membrane having a smaller textured pattern, such pattern having increased surface area and greater turbulence promotion effects.
Figure 7:
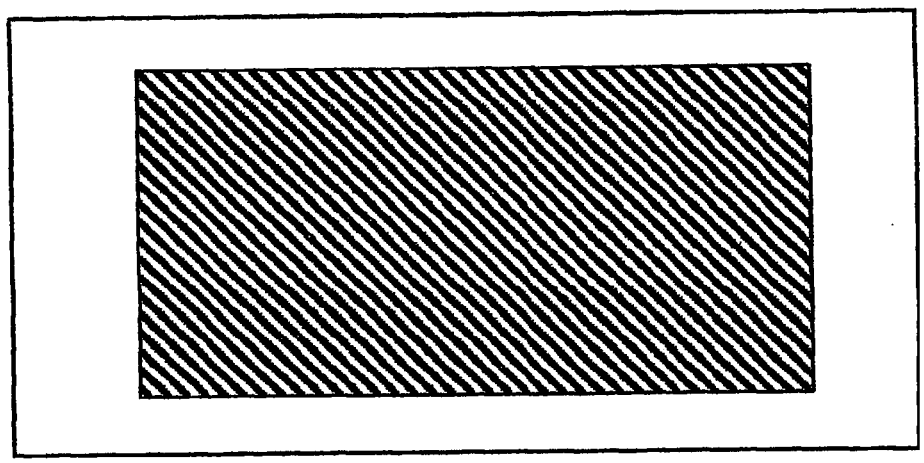
FIG. 7 is a schematic plan view of still another type of textured-surface membrane in accordance with this invention, this membrane having diagonal raised stripes. It will be understood that when the next adjacent membrane (not shown), having die stripes in an opposite orientation, is coupled with the membrane shown in FIG. 7, the resulting EDI cell would produce a self supporting flow path without need for a spacer. Such a crossed stripe pattern provides turbulence promotion, thoroughly mixing fluid as the latter travels across along such flow path.

In other preferred embodiments of this aspect of the invention, for example as shown in FIGS. 6 and 7, raised surface membranes may be fabricated so as to provide a defined flow path in the membrane surface on one or both sides of the membrane. This flow path may be of any desired shape, and may have smooth walls and bottom, or shapes may be made in the flow path to promote turbulence, or a greater contact with an ion exchange material that may be used to fill the flow path.

Textured or raised surface membranes in accordance with this aspect of the invention may advantageously be fabricated in various ways. One method involves the use of a patterned surface release layer to impart the desired texture to the membrane surface. The pattern on the release layer can be produced in many ways, such as molding, embossing, vacuum forming, etc. The release layer may be reusable or disposable depending on the cost and durability of the release layer material.

Another such method uses a patterned screen or other patterning layer outside of the release layer to form the textured surface on the membrane. The release layer in this case must be pliable enough to allow the membrane monomer to comply with the pattern under sufficient pressure to form the textured surface on the membrane.

Figure 8A:
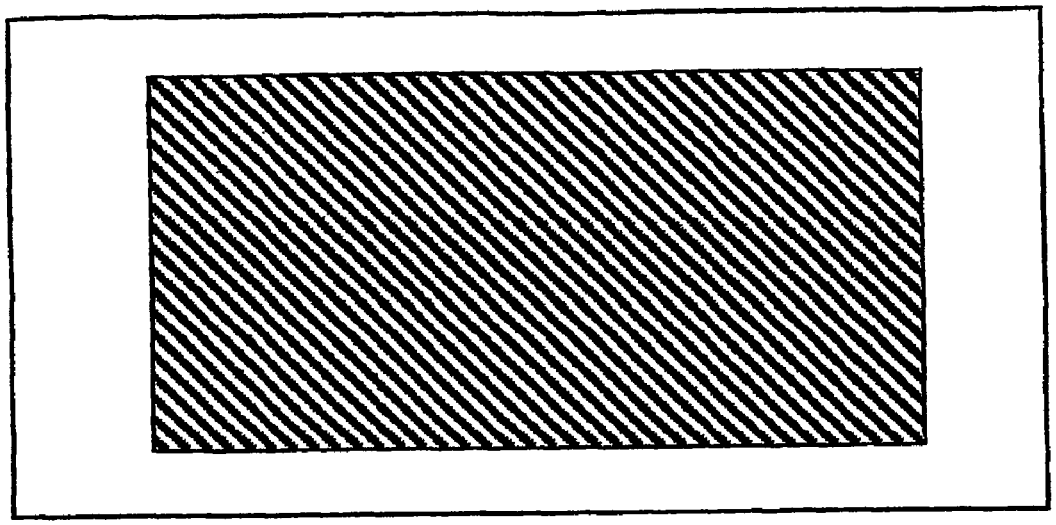
FIG. 8A is a schematic plan view and FIG. 8B is the corresponding cross sectional view of still another membrane in accordance with this invention, wherein the membrane comprises 3-dimensional pleats or folds in a flow path area. The entire body of the membrane shown in FIGS. 8A and 8B forms a pattern.
Figure 8B:
Figure 9A:
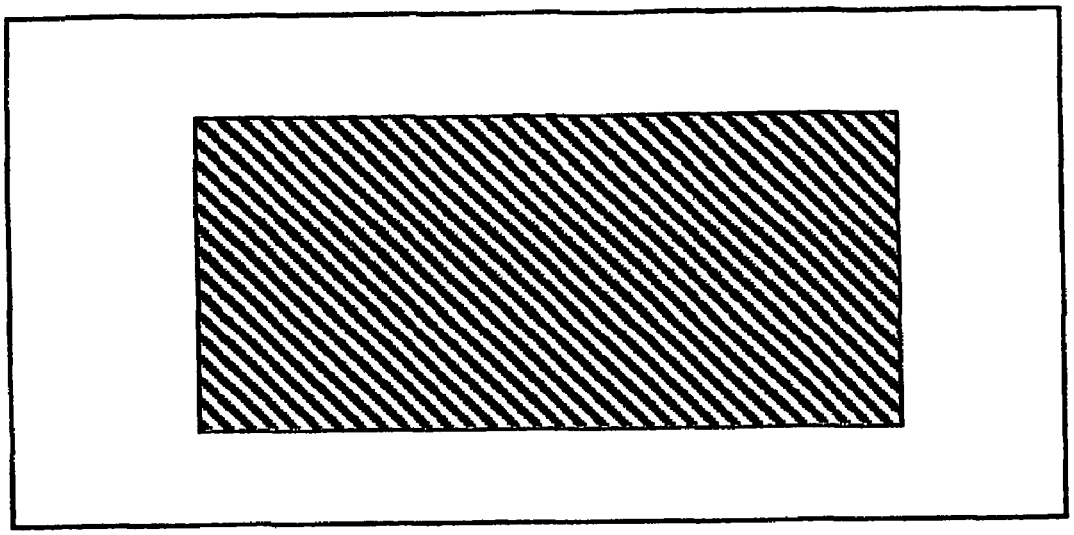
FIG. 9A is a schematic plan view and FIG. 9B is the corresponding side view of yet another membrane in accordance with this invention, wherein the membrane comprises 3-dimensional waves in a flow path area.
Figure 9B:
Figure 10:
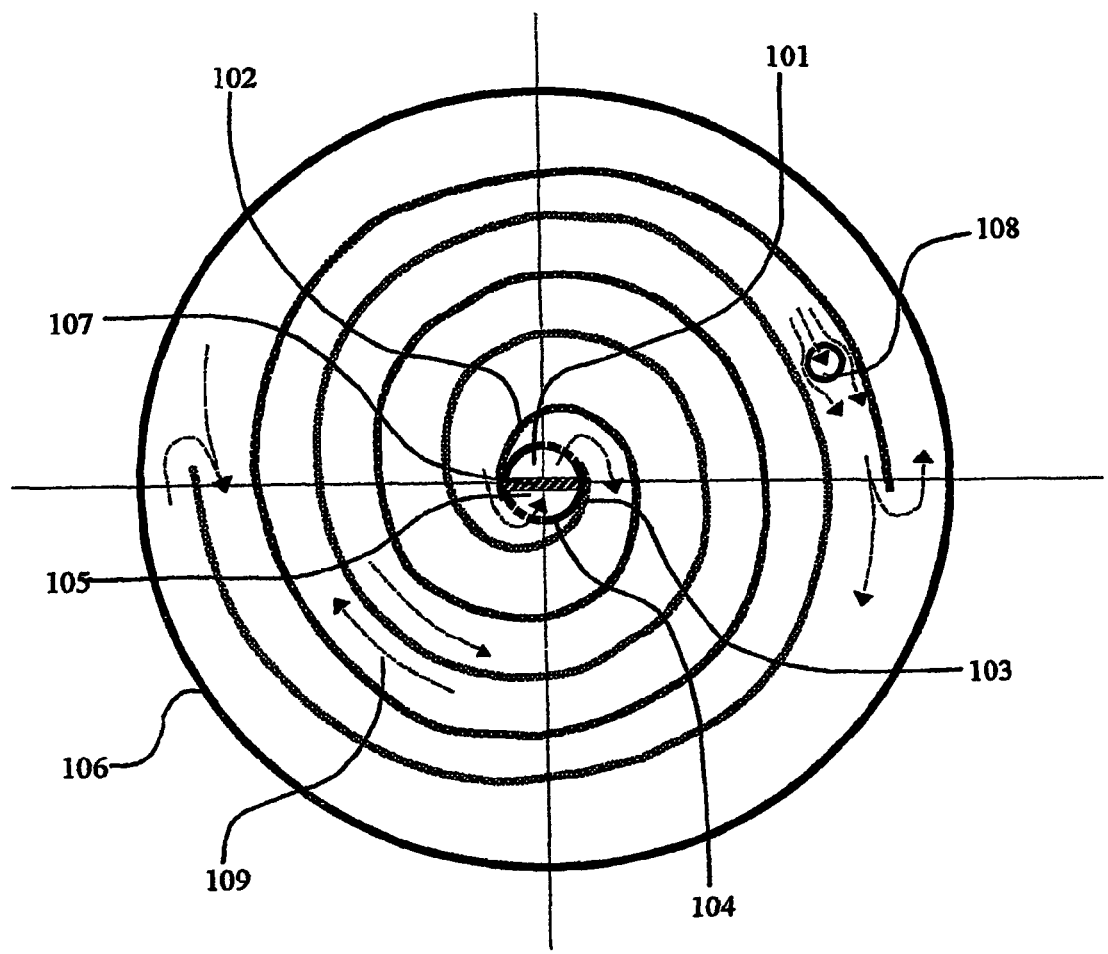
FIG. 10 is a schematic cross sectional axial view of a preferred countercurrent concentrate stream spiral EDI stack configuration in accordance with this invention. The center "pipe" or tubular element 104 is sealed to ion exchange membranes 102 and 103, and acts also as a first electrode (anode or cathode) and is internally divided by divider wall 107 to provide on a first side of wall 107 a manifold for feed inlet 101 and on a second side of wall 107 a concentrate outlet 105. The product outlet 108 is not sealed to the membranes and allows product flow 109 to bypass and feed the concentrate stream. Exterior shell 106 acts as the opposite electrode.
Figure 11:
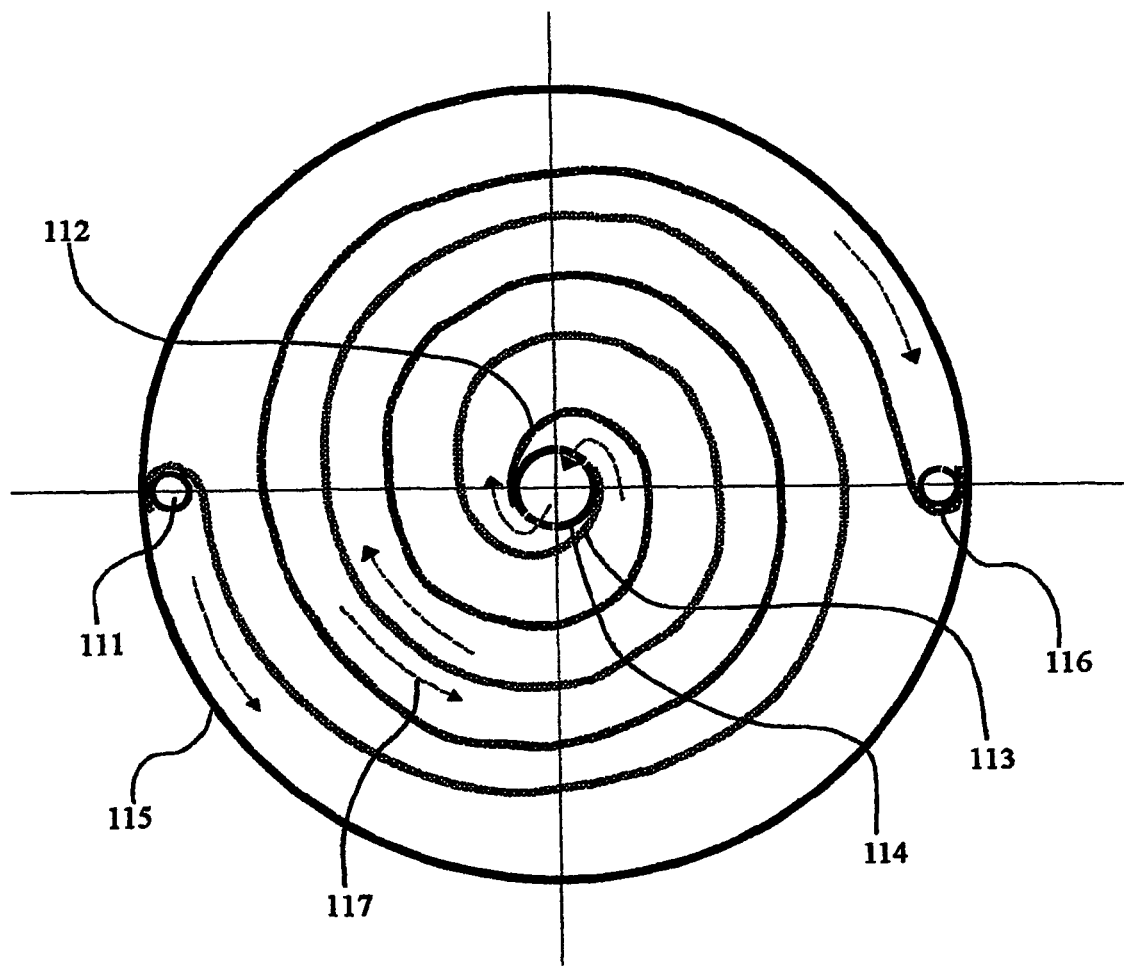
FIG. 11 is a schematic cross sectional axial view of another preferred countercurrent concentrate stream spiral stack configuration in accordance with this invention. The center "pipe" or tubular element 114 is sealed to ion exchange membranes 112 and 113, and acts as an electrode (anode or cathode), a product outlet manifold, and a brine feed inlet. The concentrate outlet manifold 116 is hydraulically sealed to the edge of the oppositely charged ion exchange membrane 112 and the exterior shell 115. Feed inlet manifold 111 providing feed flow 117 is sealed to the edge of the ion exchange membrane 113 and the exterior shell 115. The exterior shell 115 also acts as the opposite electrode.
Figure 12:
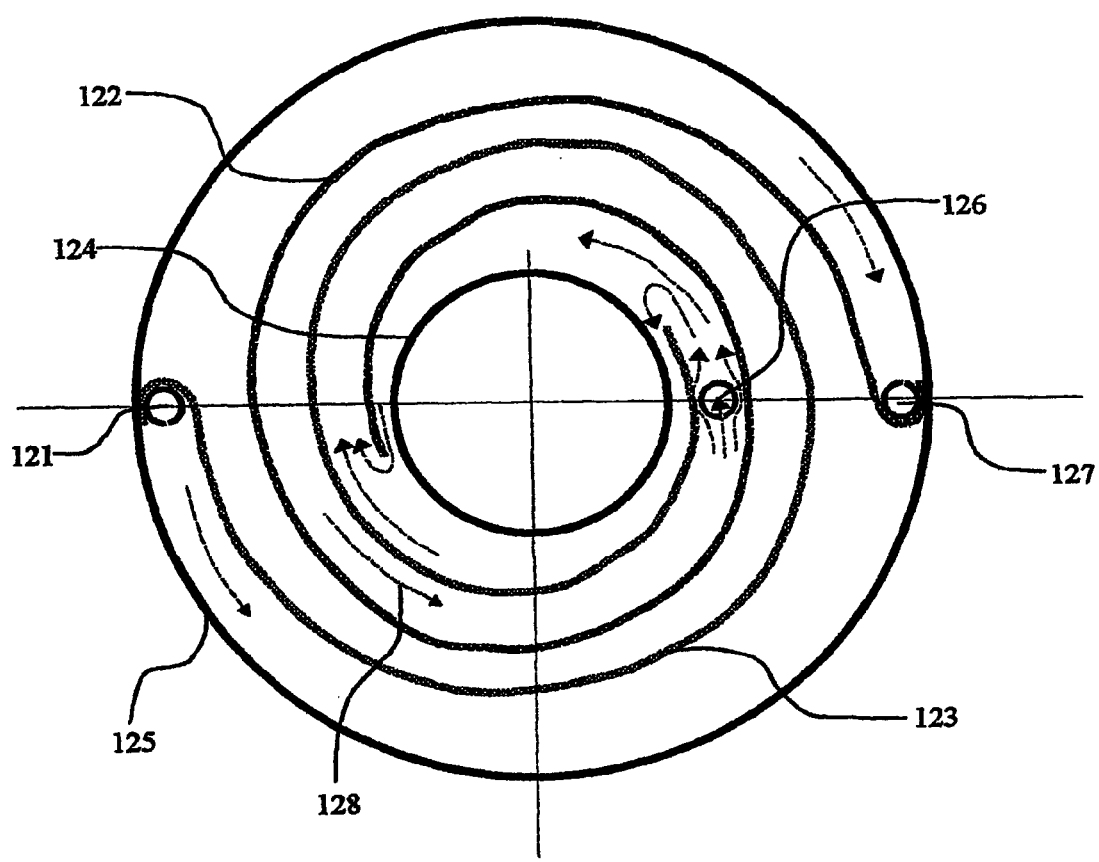
FIG. 12 is a schematic cross sectional axial view of still another preferred countercurrent concentrate stream spiral stack configuration in accordance with this invention. Center "pipe" or tubular element 124 acts as an electrode (anode or cathode) but is not hydraulically sealed to the ion exchange membranes, thereby allowing product flow to feed the concentrate stream. Product outlet manifold 126 is not hydraulically sealed to the membranes and bypass flow feeds the electrode and concentrate streams. Concentrate outlet manifold 127 is hydraulically sealed to the edge of ion exchange membrane 122 and to exterior shell 125. Feed inlet manifold 121 providing feed flow 128 is hydraulically sealed to the edge of the oppositely charged ion exchange membrane 123 and to exterior shell 125. Exterior shell 125 also acts as the opposite electrode.
Figure 13:
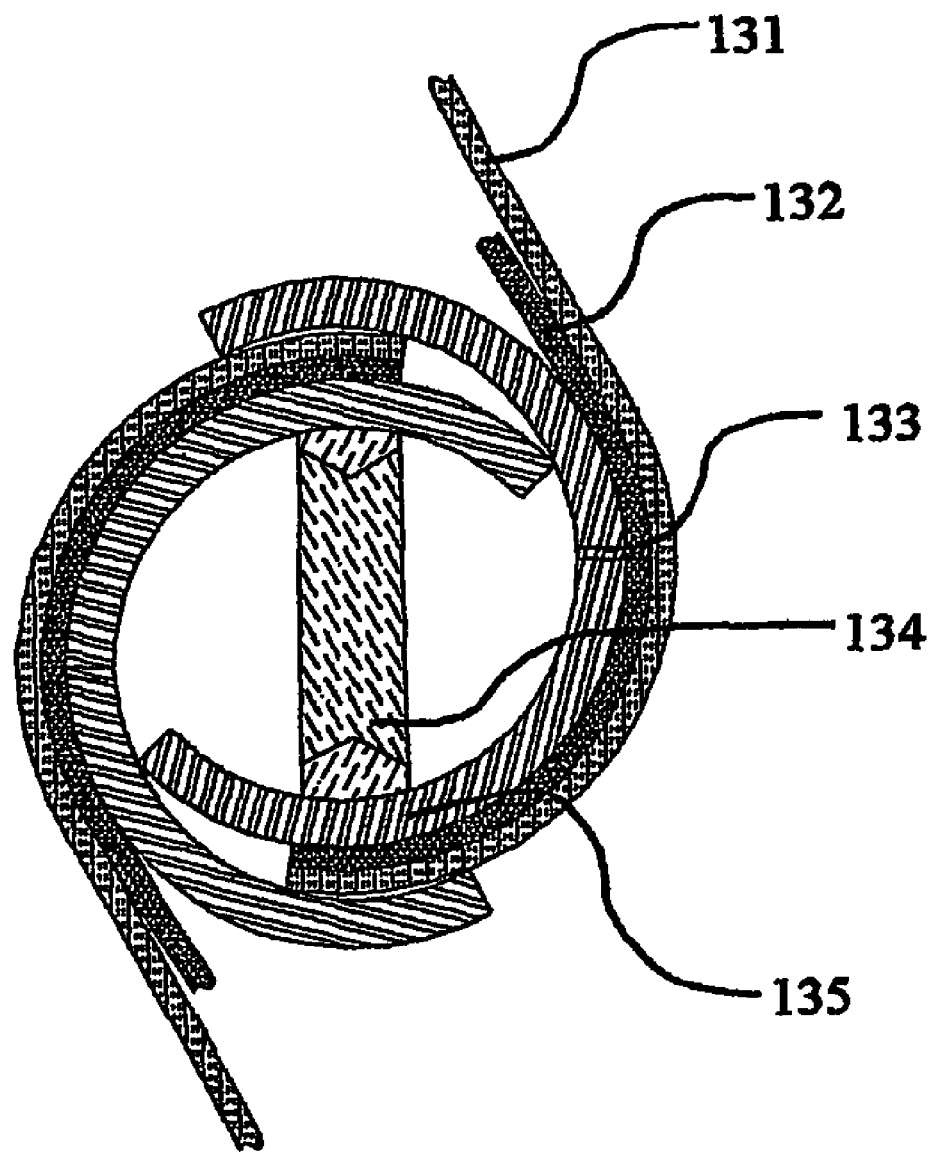
FIG. 13 is a schematic cross sectional view illustrating details of a preferred center electrode and manifolding device, comparable to element 104 in FIG. 10, which is used to clamp and hydraulically seal the membranes 131 and screens 132 to the center electrode 133. Such device consists of two arc-shaped sections of metal pipe 135 and a center wedge entity 134. The latter compresses pipe sections 135 against each other with membranes or membranes and screens clamped between such sections. The center wedge entity 134 also divides the center electrode into two manifolds and may hydraulically seal one manifold compartment from the other. Center wedge entity 134 consists of two or more pieces arranged such that forcing the pieces in opposite axial directions along the axis causes the assembly to increase in size perpendicular to such axis, thus providing the clamping force needed.

The above-described methods may be used to fabricate membranes that are substantially flat but have a textured surface. In other embodiments of this aspect of the invention, the entire membrane may be molded or otherwise formed as a three dimensional shape. The edges of the membrane may be made flat for sealing purposes while the flow path areas of the membrane may be molded as a convoluted eggcrate, pleats, waves, bumps and valleys, etc. FIGS. 8 and 9 show some possible forms that these types of membranes may take. FIG. 8 depicts an accordion-pleated membrane, with grey exaggerated decisions to the pleats for illustration purposes. The pleats should range from about 0.010 inches to about 0.5 inches. Similarly FIG. 9 depicts a wave-pattern membrane. Both pleated and wave-type patterns may be placed at angles ranging from about 10 degrees to about 80 degrees, preferably about 45 degrees, relative to the direction of the fluid flow. By placing the next membrane adjacent with the pleats or waves running in the opposite direction in contact with the pleats or waves of the first membrane, a flow path is thereby formed for the fluid between the membranes that provides significant turbulence promotion.

The membranes used in accordance with this aspect of the present invention may be reacted from the monomeric species to the substantially fully polymerized form, with the pattern-creating method in place during substantially the entire time. Alternatively, the membrane may be partially polymerized to produce what is commonly known in the art as a "prepreg" material, which can then be imprinted with a preferred pattern and thereafter substantially fully polymerized. A membrane having such aforesaid shapes or textures may be molded or formed using vacuum or pressure combined with heat from ion exchange resin mixed with a polymeric binder. This type of membrane is known in the art as a "heterogeneous membrane".

It is well known in the ED art that polarity reversal allows removal of materials that are difficult to transport through a membrane, including large ions and organic material, from the dilute stream with then subsequent release into the brine stream on the reverse cycle. This cleaning action greatly enhances the system operating time between cleanings. ED/EDI stacks that utilize the "reverse brine" concept in accordance with this invention are inherently better suited for polarity and flow reversal than conventional ED/EDI stacks that use a recirculating brine stream. In the standard ED/EDI stacks utilizing a recirculating brine stream, the ion exchange materials in the concentrating compartments are substantial in the salt form. When the DC electrical polarity is reversed, causing the concentrating compartments to become the diluting compartments, some of the salt is lost into the product stream until the downstream portion of the ion exchange materials becomes substantially regenerated by the hydrogen and hydroxyl ions generated by water splitting. During the time required for this regeneration to occur, the resistivity of the product is substantial lower (because of increased ion content) than during normal operation, so that this portion of product water must be discarded or recycled. If this water portion were blended into the normal product, it would produce an overall lower resistivity and lower quality product.

By contrast, in the reverse brine stacks according to the present invention, the part of the ion exchange materials near the feed inlets to the diluting compartments, and the part near the outlets of the concentrating compartments, are mostly in the salt form; and, the part of the ion exchange materials nearer to the outlet of the diluting compartment, and that nearer to the inlet of the concentrating compartment, are mostly in the regenerated form. Thus, when the DC electrical polarity is reversed (and the concentrating compartments become the diluting compartments, and the flows are reversed in direction in both types of compare), the resistivity of the product water is maintained at substantially the same level as during normal operation. This represents a substantial improvement over conventional ED/EDI systems. This polarity reversal can take place frequently, such as several times per hour or less frequency such as daily or even every few months. This reversal can be accomplished automatically or manually by means of appropriate valves, or can be accomplished by manual "replumbing" of the systems. Chemical release agents including salts, acids, bases, and/or nonionic detergents may be added to the brine stream. In a preferred embodiment an additional inlet means may be provided at a point in the brine stream downstream of the brine inlet means for the introduction of aforesaid chemical release agents.

In accordance with another aspect of this invention described herein, an uneven membrane texture or raised resin shapes are imparted to one or both surfaces of ion exchange membranes, creating a significantly greater surface area for use in EDI, ED, EDR or other electrically driven processes, which use ion exchange membranes and benefit from having a non-flat surface, as well as for use in standard ion exchange processes. The raised surface membranes are used in EDI together with, or in place of, ion exchange resins that are usually placed between two membranes or between membranes and electrodes. Any section of an EDI stack where an ion exchange resin next to the same-charge ion exchange membrane is presently used can be advantageously replaced with a textured or raised surface membrane. Also, these types of membranes may be advantageously used in any electrodialysis compartment that benefits from an increase in turbulent flow across the membrane and/or increased membrane surface area or through the channels between membranes and electrodes. These surface textured membranes are also advantageously used in an EDI stack to improve the contact area between ion exchange materials in the filled cells and the membrane. Increased contact area decreases cell electrical resistance and improves the transport of ions from the ion exchange filler material to the ion exchange membranes.

It will be apparent to those skilled in the art that other changes and modifications may be made in the above-described apparatus, processes and methods without departing from the scope of the invention here, and it is intended that all matter contained in the above description shad be interpreted in an illustrative and not a limiting sense.

What is claimed is:

1. An electrodialysis apparatus comprising a membrane stack defining a plurality of diluting compartments, alternating with a plurality of concentrating compartments, whereby each diluting compartment is adjacent to a concentrating compartment along at least one diluting compartment side, and each concentrating compartment is adjacent to a diluting compartment along at least one concentrating compartment side, diluting compartment and concentrating compartment spacers, at least an electrode compartment, at least an electrode pair for establishing an electric current across said stack, and inlets and outlets for flowing liquids to or from the stack, said stack further comprising at least one subsystem selected from the group consisting of:

a) a manifold system comprising at least a product outlet manifold which is internal to said stack and intersects a plurality of the compartments, said product outlet manifold being configured to receive product streams from a plurality of the diluting compartments in said stack and also to serve as an internal inlet manifold for feeding effluent portions of said product streams to a plurality of the concentrating compartments in said stack where the manifold intersects such concentrating compartments without said effluent portions leaving the stack whereby portions of product streams from a plurality of diluting compartments in said stack flow into and through a plurality of concentrating compartments in said stack in a flow direction that is substantially opposite to a direction of fluid flow in said diluting compartments; and, b) a manifold system comprising at least a product outlet manifold which is internal to said stack and intersects a plurality of the compartments, said product outlet manifold being configured to receive product streams from a plurality of diluting compartments in said stack and also to serve as an internal inlet manifold for feeding effluent portions of said product streams to one or more electrode compartments in said stack where the manifold intersects such electrode compartments without said effluent portions leaving the stack whereby portions of product streams from a plurality of diluting compartments in said stack flow into and through one or more electrode compartments in said stack.

2. An electrodialysis apparatus according to claim 1(a) further wherein said product outlet manifold is further configured to serve as an internal inlet manifold for also feeding a portion of said product streams to at least one electrode compartment without said portion leaving the stack.

3. An electrodialysis apparatus according to claim 1(a), wherein said apparatus comprises two electrode compartments, and further wherein said product outlet manifold is configured to serve as an internal inlet manifold for also feeding a portion of said product streams to each of said electrode compartments without said portion leaving the stack.

4. An electrodialysis apparatus according to claim 1 wherein, in one or more compartments, cation exchange material is juxtaposed to cation exchange membrane and anion exchange material is juxtaposed to anion exchange membrane.

5. An electrodialysis apparatus according to claim 4 wherein the cation exchange material is not integral with the cation exchange membrane.

6. An electrodialysis apparatus according to claim 4 wherein the anion exchange material is not integral with the anion exchange membrane.

7. An electrodialysis apparatus according to claim 4 wherein the cation exchange material is not integral with the cation exchange membrane and the anion exchange material is not integral with the anion exchange membrane.

8. A process for removing ionized and/or ionizable substances from a liquid containing such ionized and/or ionizable substances, the process comprising the steps of:
(A) providing an electrodialysis membrane stack defining a plurality of diluting compartments, alternating with a plurality of concentrating compartments, whereby each diluting compartment is adjacent to a concentrating compartment along at least one diluting compartment side, and each concentrating compartment is adjacent to a diluting compartment along at least one concentrating compartment side, at least an electrode compartment, at least an electrode pair for establishing an electric current across said stack, and inlets and outlets for flowing liquids to or from the stack, said stack further comprising at least one subsystem selected from the group consisting of:
a) a manifold system comprising at least a product outlet manifold which is internal to said stack and intersects a plurality of the compartments, said product outlet manifold being configured to receive product streams from a plurality of diluting compartments in said stack and also to serve as an internal inlet manifold for feeding effluent portions of said product streams to a plurality of concentrating compartments in said stack where the manifold intersects such concentrating compartments without said effluent portions leaving the stack whereby portions of product streams from a plurality of diluting compartments in said stack flow into and through a plurality of concentrating compartments in said stack in a flow direction that is substantially opposite to a direction of fluid flow in said diluting compartments; and,
b) a manifold system comprising at least a product outlet manifold which is internal to said stack and intersects a plurality of the compartments, said product outlet manifold being configured to receive product streams from a plurality of diluting compartments in said stack and also to serve as an internal inlet manifold for feeding effluent portions of said product streams to one or more electrode compartments in said stack where the manifold intersects such electrode compartments without said effluent portions leaving the stack whereby portions of product streams from a plurality of diluting compartments of said stack flow into and through at least one electrode compartment of said stack; and, (B) flowing said liquid into said stack and applying electrical current to said stack.

9. A process according to claim 8 wherein, in one or more compartments, cation exchange material is juxtaposed to cation exchange membrane and anion exchange material is juxtaposed to anion exchange membrane.

10. A process according to claim 9 wherein the cation exchange material is not integral with the cation exchange membrane.

11. A process according to claim 9 wherein the anion exchange material is not integral with the anion exchange membrane.

12. A process according to claim 9 wherein the cation exchange material is not integral with the cation exchange membrane and the anion exchange material is not integral with the anion exchange membrane.

13. An electrodialysis apparatus comprising a membrane stack defining a plurality of diluting compartments, alternating with a plurality of concentrating compartments, whereby each diluting compartment is adjacent to a concentrating compartment along at least one diluting compartment side, and each concentrating compartment is adjacent to a diluting compartment along at least one concentrating compartment side, diluting compartment and concentrating compartment spacers, at least an electrode compartment, at least an electrode pair for establishing an electric current across said stack, and inlets and outlets for flowing liquids to or from the stack, said stack further comprising a manifold system comprising at least a product outlet manifold which is internal to said stack and intersects a plurality of the compartments, said product outlet manifold being configured to receive product streams from at least two diluting compartments in said stack and also to serve as an internal manifold for feeding effluent portions of said product streams to at least two concentrating compartments in said stack where the manifold intersects such concentrating compartments without said effluent portions leaving the stack whereby portions of product streams from at least two diluting compartments in said stack flow into and through at least two concentrating compartments in said stack in a flow direction that is substantially opposite to a direction of fluid flow in said diluting compartments.

14. An electrodialysis apparatus according to claim 13 further comprising cation exchange membranes and anion exchange membranes wound together in spiral form, together forming spiral diluting compartments and spiral concentrating compartments.

15. An electrodialysis apparatus according to claim 14 further comprising liquid entrances and liquid exits arranged to effect flow of liquid in said one or more spiral diluting compartments inwardly in a spiral or alternatively outwardly in a spiral.

16. An electrodialysis apparatus according to claim 14, wherein said one or more spiral diluting compartments define a central axis, said stack also having one or more liquid entrances and exits arranged to effect flow of liquid in said one or more spiral diluting compartments in a direction substantially parallel to said central axis.

17. An electrodialysis apparatus according to claim 14, wherein said one or more spiral concentrating compartments define a central axis, said stack also having one or more liquid entrances and exits arranged to effect flow of liquid in said one or more spiral concentrating compartments inwardly in a spiral or alternatively outwardly in a spiral.

18. An electrodialysis apparatus according to claim 14, wherein said one or more spiral concentrating compartments define a central axis, said stack also having one or more liquid entrances and exits arranged to effect flow of liquid in said one or more spiral concentrating compartments in a direction substantially parallel to said central axis.

19. An electrodialysis apparatus according to claim 13 further comprising an electric current switch mechanism for reversing a direction of electric current being directed across said stack.

20. An electrodialysis apparatus according to claim 13 further comprising a fluid flow control mechanism for periodically reversing fluid flow directions in said diluting compartments and said concentrating compartments of the stack.

21. An electrodialysis apparatus according to claim 13 further wherein a diluting compartment comprises a cation exchange membrane and an anion exchange membrane having ion exchange material juxtaposed to said cation exchange membrane and to said anion exchange membrane, at least said ion exchange material juxtaposed to said anion exchange membrane comprising anion exchange material, said anion exchange material located in regions adjacent to diluting compartment entrances being effective to remove free and combined (available) carbon dioxide from liquid entering said diluting compartments when such combined carbon dioxide is substantially only bicarbonate.

22. An electrodialysis apparatus according to claim 21 wherein said anion exchange material in regions adjacent to said compartment entrances is not integral with said anion exchange membrane.

23. An electrodialysis apparatus according to claim 21 wherein said anion exchange material in regions adjacent to said compartment entrances is at least in part integral with said anion exchange membrane.

24. An electrodialysis apparatus according to claim 13 including an electric current control system for maintaining predetermined removal of silica and/or boric acid in said diluting compartments which comprises at least one segmented electrode and a control mechanism responsive to the ionic load for controlling electrical currents to said at least one segmented electrode.

25. An electrodialysis apparatus according to claim 13 including an electric current control system for maintaining removal of free and combined carbon dioxide in the predetermined regions which comprises at least one segmented electrode and a control mechanism responsive to the ionic load for controlling electrical currents to said at least one segmented electrode.

26. An electrodialysis apparatus according to claim 13 comprising a membrane stack defining a plurality of diluting compartments, alternating with a plurality of concentrating compartments, diluting compartment and concentrating compartment spacers, at least an electrode compartment, at least an electrode pair for establishing an electric current across said stack, and inlets and outlets for flowing liquids to or from the stack, said stack further comprising diluting compartments and concentrating compartments comprising at least one membrane having a surface texture facing at least part of at least one flow path in at least some of said diluting and concentrating compartments, said surface texture being effective to establish substantial contact with an adjacent membrane, said adjacent membrane having or not having such a surface texture.

27. An electrodialysis apparatus according to claim 13 wherein said product outlet manifold which is internal to said stack comprises a set of aligned apertures in the membranes comprising said membrane stack.

28. An electrodialysis apparatus according to claim 13 further wherein said product outlet manifold is further configured to serve as an internal inlet manifold for also feeding a portion of said product streams to at least one electrode compartment without said portion leaving the stack.

29. An electrodialysis apparatus according to claim 13, wherein said apparatus comprises two electrode compartments, and further wherein said product outlet manifold is configured to serve as an internal inlet manifold for also feeding a portion of said product streams to each of said electrode compartments without said portion leaving the stack.

30. An electrodialysis apparatus according to claim 13 wherein, in one or more compartments, cation exchange material is juxtaposed to cation exchange membrane and anion exchange material is juxtaposed to anion exchange membrane.

31. An electrodialysis apparatus according to claim 13 wherein the cation exchange material is not integral with the cation exchange membrane.

32. An electrodialysis apparatus according to claim 13 wherein the anion exchange material is not integral with the anion exchange membrane.

33. An electrodialysis apparatus according to claim 13 wherein the cation exchange material is not integral with the cation exchange membrane and the anion exchange material is not integral with the anion exchange membrane.

34. A process for removing ionized and/or ionizable substances from a liquid containing such ionized and/or ionizable substances, the process comprising the steps of:
(A) providing an electrodialysis membrane stack defining a plurality of diluting compartments, alternating with a plurality of concentrating compartments, whereby each diluting compartment is adjacent to a concentrating compartment along at least one diluting compartment side, and each concentrating compartment is adjacent to a diluting compartment along at least one concentrating compartment side, diluting compartment and concentrating compartment spacers, at least an electrode compartment, at least an electrode pair for establishing an electric current across said stack, and inlets and outlets for flowing liquids to or from the stack, said stack further comprising a manifold system comprising at least a product outlet manifold which is internal to said stack and intersects a plurality of the compartments, said product outlet manifold being configured to receive product streams from at least two diluting compartments in said stack and also to serve as an internal inlet manifold for feeding effluent portions of said product streams to at least two concentrating compartments in said stack where the manifold intersects such concentrating compartments without said effluent portions leaving the stack whereby portions of product streams from at least two diluting compartments in said stack flow into and through at least two concentrating compartments in said stack in a flow direction that is substantially opposite to a direction of fluid flow in said diluting compartments; and, (B) flowing said liquid into said stack and applying electrical current to said stack.

35. A process according to claim 34 further comprising the steps of providing cation exchange membranes and anion exchange membranes and winding them together in spiral form, together forming spiral diluting compartments and spiral concentrating compartments.

36. A process according to claim 35 further comprising the steps of providing liquid entrances and exits arranged to effect flow of liquid in said spiral diluting compartments inwardly in a spiral or alternatively outwardly in a spiral, and of establishing flow of liquid in said compartments inwardly in said spiral or alternatively outwardly in said spiral.

37. A process according to claim 35 further comprising the steps of providing spiral diluting compartments defining a central axis, providing one or more liquid entrances and exits arranged to effect flow of liquid in said spiral diluting compartments in a direction substantially parallel, or alternatively anti-parallel, to said axis, and periodically flowing liquid in said compartments parallel, or alternatively anti-parallel, to said axis.

38. A process according to claim 34 further comprising the steps of providing an electric current switch mechanism for reversing electrical current direction across said stack and periodically using said switch mechanism for reversing electrical current direction.

39. A process according to claim 34 further comprising the steps of providing a fluid flow control mechanism for periodically reversing flow direction in diluting compartments and in concentrating compartments, and periodically using said fluid flow control mechanism for reversing flow direction in diluting compartments and in concentrating compartments.

40. A process according to claim 34 further comprising the steps of: (a) providing in diluting compartments of said stack ion exchange material juxtaposed to a cation exchange membrane and to an anion exchange membrane, at least said ion exchange material juxtaposed to said anion exchange membrane comprising anion exchange material, said anion exchange material located in regions adjacent to diluting compartment entrances being effective to remove free and combined (available) carbon dioxide from liquid entering said diluting compartments when such combined carbon dioxide is substantially only bicarbonate; (b) flowing liquid into said diluting compartments wherein said liquid includes free and/or combined carbon dioxide; and (c) removing free and combined carbon dioxide from said liquid at the diluting compartment entrances using said anion exchange material.

41. A process according to claim 34 further comprising the steps of providing at least one segmented electrode controlled by an electric current control system responsive to the ionic load fed to said diluting compartments, and controlling electrical currents to said at least one segmented electrode using said control system.

42. A process according to claim 34 further comprising the steps of:

(a) providing an electric current regulating system for optimizing electric current; (b) determining dependency of $R_{prod}$ on the quantity $I/q(c_{in}-c_{out})$, where $R_{prod}$ is a measure of the electrical resistance of product of diluting compartments in said stack, I is a measure of electrical current applied to said stack, q is a measure of flow rate in said diluting compartments, $c_{in}$ is a measure of ionized and/or ionizable species per unit volume in liquid influent to said diluting compartments, $c_{out}$ is a measure of ionized and/or ionizable species per unit volume in liquid effluent from said diluting compartments; (c) determining any substantial inflection in said dependency; and, (d) operating said stack at one or more values of $I/q(c_{in}-c_{out})$ which result in values of $R_{prod}$ greater than the value of $R_{prod}$ at such inflection.

43. A process according to claim 34 further comprising the steps of establishing a predetermined removal of silica and/or boric acid in diluting compartments of said stack, determining the ionic load fed to said diluting compartments, and controlling electrical current based on said ionic load at levels effective to maintain such predetermined removal of silica and/or boric acid.

44. A process according to claim 34 further comprising the steps of establishing in diluting compartments of said stack predetermined regions for removal of free and combined carbon dioxide, determining the ionic load fed to said diluting compartments, and controlling electrical current based on said ionic load at levels effective to maintain removal of free and combined carbon dioxide within said predetermined regions.

45. A process according to claim 34 wherein said product outlet manifold which is internal to said stack comprises a set of aligned apertures in the membranes comprising said membrane stack.

46. A process according to claim 34 wherein, in one or more compartments, cation exchange material is juxtaposed to cation exchange membrane and anion exchange material is juxtaposed to anion exchange membrane.

47. A process according to claim 34 wherein the cation exchange material is not integral with the cation exchange membrane.

48. A process according to claim 34 wherein the anion exchange material is not integral with the anion exchange membrane.

49. A process according to claim 34 wherein the cation exchange material is not integral with the cation exchange membrane and the anion exchange material is not integral with the anion exchange membrane.

* * * * *